United States Patent
Hirano et al.

(10) Patent No.: US 10,673,614 B2
(45) Date of Patent: Jun. 2, 2020

(54) SECRET SEARCH SYSTEM, MANAGEMENT DEVICE, SECRET SEARCH METHOD AND COMPUTER READABLE MEDIUM

(71) Applicant: Mitsubishi Electric Corporation, Tokyo (JP)

(72) Inventors: Takato Hirano, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 15/764,780

(22) PCT Filed: Oct. 9, 2015

(86) PCT No.: PCT/JP2015/078712
§ 371 (c)(1),
(2) Date: Mar. 29, 2018

(87) PCT Pub. No.: WO2017/061024
PCT Pub. Date: Apr. 13, 2017

(65) Prior Publication Data
US 2018/0278410 A1    Sep. 27, 2018

(51) Int. Cl.
*H04L 9/00* (2006.01)
*G06F 16/33* (2019.01)
(Continued)

(52) U.S. Cl.
CPC ............ *H04L 9/008* (2013.01); *G06F 16/334* (2019.01); *G06F 16/951* (2019.01); *G09C 1/00* (2013.01);
(Continued)

(58) Field of Classification Search
CPC .............................. H04L 9/008; G06F 16/334
(Continued)

(56) References Cited

U.S. PATENT DOCUMENTS

| 8,515,058 B1 | 8/2013 | Gentry |
| 2009/0006855 A1 | 1/2009 | Tuyls et al. |

(Continued)

FOREIGN PATENT DOCUMENTS

| JP | 2005-134990 A | 5/2005 |
| JP | 2007-114494 A | 5/2007 |

(Continued)

OTHER PUBLICATIONS

Boneh et al., "Evaluating 2-DNF Formulas on Ciphertexts", TCC 2005, Lecture Notes in Computer Science 3378, Springer-Verlag Berlin Heidelberg, 2005, pp. 325-341.
(Continued)

*Primary Examiner* — Anthony D Brown
(74) *Attorney, Agent, or Firm* — Birch, Stewart, Kolasch & Birch, LLP

(57) ABSTRACT

The present invention is provided with an encryption similarity calculation unit to calculate an encryption similarity being a similarity degree between storage data and search data encrypted using a homomorphic encryption, by performing a homomorphic operation on storage encryption data being the storage data encrypted using the homomorphic encryption, and search encryption data being the search data encrypted using the homomorphic encryption, the search data being used in search of the storage data, and an encryption result transmission unit to generate an encryption search result to represent whether or not the similarity degree is not more than a threshold value θ by using the encryption similarity, and to transmit the encryption search result to a search device.

11 Claims, 15 Drawing Sheets

(51) Int. Cl.
*G09C 1/00* (2006.01)
*H04L 9/08* (2006.01)
*G06F 16/951* (2019.01)

(52) U.S. Cl.
CPC .......... *H04L 9/0869* (2013.01); *H04L 9/0894* (2013.01)

(58) Field of Classification Search
USPC .......................................................... 380/28
See application file for complete search history.

(56) References Cited

U.S. PATENT DOCUMENTS

| | | |
|---|---|---|
| 2013/0318351 A1 | 11/2013 | Hirano et al. |
| 2014/0185794 A1 | 7/2014 | Yasuda et al. |
| 2014/0185797 A1 | 7/2014 | Yasuda et al. |
| 2014/0208101 A1* | 7/2014 | Naganuma .............. G06F 21/60 713/164 |
| 2014/0355756 A1 | 12/2014 | Iwamura et al. |
| 2015/0046708 A1 | 2/2015 | Yasuda et al. |
| 2015/0207630 A1 | 7/2015 | Shimoyama et al. |

FOREIGN PATENT DOCUMENTS

| | | |
|---|---|---|
| JP | 2010-165275 A | 7/2010 |
| JP | 2013-105207 A | 5/2013 |
| JP | 2013-145420 A | 7/2013 |
| JP | 2014-126865 A | 7/2014 |
| JP | 2014-126866 A | 7/2014 |
| JP | 2015-031935 A | 2/2015 |
| JP | 2015-139014 A | 7/2015 |
| WO | WO 2013/038698 A1 | 3/2013 |

OTHER PUBLICATIONS

Boneh et al., "Public Key Encryption with Keyword Search", EUROCRYPT 2004, Lecture Notes in Computer Science 3027, International Associate for Cryptologic Research, 2004, pp. 506-522.
Catalano et al., "Boosting Linearly-Homomorphic Encryption to Evaluate Degree-2 Functions on Encrypted Data", IACR Cryptology ePrint Archive: Report 2014/813, 2014, 28 pages.
Gentry, "Fully Homomorphic Encryption Using Ideal Lattices", Proceedings of the 41st ACM Symposium on Theory of Computing, ACM, New York, NY, 2009, pp. 169-178.
International Search Report for PCT/JP2015/078712 (PCT/ISA/210) dated Dec. 15, 2015.
Kogure et al., "Encripted String Search via Homomorphic Encryption", The 31st Symposium on Cryptography and Information Security, The Institute of Electronics, Information and Communication Engineers, Kagoshima, Japan, Jan. 21-24, 2014, 10 pages.
Paillier, "Public-Key Cryptosystems Based on Composite Degree Residuosity Classes", EUROCRYPT 1999, Lecture Notes in Computer Science 1592, Springer-Verlag Berlin Heidelberg, 1999, pp. 223-238.
Extended European Search Report dated Jun. 5, 2018 in corresponding European Patent Application No. 15905843.7.
Office Action dated Jan. 21, 2020 in corresponding European Application No. 15905843.7.

* cited by examiner

SECRET SEARCH SYSTEM, MANAGEMENT DEVICE, SECRET SEARCH METHOD AND COMPUTER READABLE MEDIUM

TECHNICAL FIELD

The present invention relates to a secret search system, a management device, a secret search method and a secret search program.

BACKGROUND ART

Secret search is a technique capable of retrieving search target data and search contents in an encrypted state.

In recent years, the spread of cloud services, etc., has made it possible to manage data over the internet. However, data management over the internet has a risk of external leakage of deposited data by such reasons that a cloud server entrusted with data management is infected with malware, such as a computer virus, etc., or an administrator of a server commits a fraud, etc. If the data deposited in the server is private information or confidential corporate data, this leakage is a serious problem.

There are encryption techniques as methods to avoid such a security threat. However, there is a problem that data search becomes impossible when data is simply encrypted and stored on a server. In order to avoid the problem, a method has been conventionally adopted wherein encryption data stored on a server is temporarily decrypted and searched at the time of performing search. However, since a plaintext is recovered from the data for a certain period of time in the server, it cannot be said that the method is sufficient as a security measure. Thus, secret search techniques that are cryptographic techniques capable of searching while keeping data in an encrypted state have been devised, and a number of specific methods of the secret search techniques have been disclosed in recent years.

Non-Patent Literature 1 discloses, as a search function in a secret search technique, a scheme capable of exact-match searches being simple searches.

Further, Patent Literature 1, Patent Literature 2, Patent Literature 3 and Non-Patent Literature 2 disclose schemes capable of similarity searches being more flexible searches. Hereinafter, secret search techniques capable of similarity searches are called secret similarity search techniques. Patent Literature 1 and Non-Patent literature 2 disclose secret similarity search techniques capable of efficiently calculating the Hamming distance using special cryptographic techniques referred to as homomorphic encryptions capable of operations while keeping an encrypted state.

Further, Non-Patent Literature 3, Non-Patent Literature 4, Non-Patent Literature 5 and Non-Patent Literature 6 also disclose homomorphic encryptions.

In the secret similarity search techniques, from encryption data stored in a server by a data registrant, and a ciphertext of data which a data searcher desires to retrieve, it is possible to calculate a similarity degree between each plaintext while keeping the encryption data and the ciphertext of data secret without decrypting each of the encryption data and the ciphertext. Hereinafter, the encryption data stored in the server by the data registrant is called storage encryption data. In addition, the ciphertext of data which the data searcher desires to retrieve is called search encryption data. Further, as schematic examples of the similarity degree between plaintexts, there are the squared Euclidean distance between a plaintext of the storage encryption data and a plaintext of the search encryption data, and etc.

If there is a request for search from the data searcher, i.e., a request for similarity calculation, the server calculates a similarity degree while keeping it secret, and transmits the calculation result to the data searcher. Then, the data searcher can recognize the similarity degree by decryption. As mentioned above, the secret similarity search technique has an aspect as a secret analytical technique not only as a search technique.

As a specific example, when it is assumed that a data registrant is a patient, and a data searcher is an analyst, the secret similarity search technique is capable of analyzing private data of the patient in an encrypted state while keeping privacy of the patient, i.e., without opening the private data to the public. Therefore, the patient can request analysis to the data analyst at ease. Thus, such a secret similarity search technique is very useful also from the point of view of privacy protection.

CITATION LIST

Patent Literature

Patent Literature 1: JP 2015-031935 A
Patent Literature 2: JP 2013-105207 A
Patent Literature 3: WO 2013/038698 A Non-Patent Literature Non-Patent Literature 1: D. Boneh, G. D. Crescenzo, R. Ostrovsky, and G. Persiano, "Public Key Encryption with Keyword Search," EUROCRYPT 2004, Lecture Notes in Computer Science 3027, Springer, 2004.

Non-Patent Literature 2: Kogure, Yasuda, Shimoyama, Koshiba, Yokoyama, "Encrypted String Search via Homomorphic Encryption," $31^{st}$ Symposium on Cryptography and Information Security (SCIS2014), 1D3-5, 2014.

Non-Patent Literature 3: C. Gentry, "Fully Homomorphic Encryption Using Ideal Lattices," ACM Symposium on Theory of Computing, pp. 169-178, 2009.

Non-Patent Literature 4: D. Boneh, E-J. Goh, and K. Nissim, "Evaluating 2-DNF Formulas on Ciphertexts," TCC 2005, Lecture Notes in Computer Science 3378, Springer, 2005.

Non-Patent Literature 5: P. Paillier, "Public-Key Cryptosystems Based on Composite Degree Residuosity Classes," Eurocrypt 1999, Lecture Notes in Computer Science 1592, Springer, 1999.

Non-Patent Literature 6: D. Catalano and D. Fiore, "Boosting Linearly-Homomorphic Encryption to Evaluate Degree-2 Functions on Encrypted Data," IACR Cryptology ePrint Archive: Report 2014/813.

SUMMARY OF INVENTION

Technical Problem

Problems in existing secret similarity search techniques will be discussed.

Patent Literature 1 and Non-Patent Literature 2 disclose secret similarity search techniques capable of efficiently calculating the Hamming distance using special cryptographic techniques referred to as homomorphic encryptions capable of operations while keeping an encrypted state. By the methods disclosed here, as a result of data search by a data searcher, the degrees of similarity between a plaintext of storage encryption data and a plaintext of search encryption data can be recognized by the data searcher in plaintexts. The values of the degrees of similarity do not appear at all on a server. At this time, it may be possible for the data searcher to guess the plaintext of the storage encryption data from two pieces of data of the plaintext of search encryption data and the similarity degree.

Explanation will be made using a schematic example. When it is assumed that a plaintext of storage encryption data is (0, 0, 0, 1, 1), and a plaintext of search encryption data is (0, 0, 0), the data searcher can obtain as a similarity degree of the search result, i.e., the Hamming distance, (0, 1, 2). Specifically, when (0, 0, 0, 1, 1) is retrieved by using (0, 0, 0), the data searcher can obtain the Hamming distance (=0) between (0, 0, 0) being the first three components of (0, 0, 0, 1, 1) and (0, 0, 0), the Hamming distance (=1) between (0, 0, 1) being the next three components of (0, 0, 0, 1, 1) and (0, 0, 0), and the Hamming distance (=2) between (0, 1, 1) being the next three components of (0, 0, 0, 1, 1) and (0, 0, 0).

Meanwhile, it is assumed that the plaintext of the search encryption data is (0, 0, 0), and the data searcher can obtain (0, 1, 2) as the Hamming distance between the plaintext (0, 0, 0) and the plaintext of the storage encryption data. At this time, the data searcher can easily identify the plaintext of the storage encryption data as (0, 0, 0, 1, 1).

As described above, when it is assumed that a data registrant is a patient, and a data searcher is an analyst, there is a possibility that the analyst can guess data of the patient from search data and a similarity degree. Therefore, even by using the methods disclosed in Patent Literature 1 and Non-Patent Literature 2, there is a problem that privacy of patients cannot be maintained.

Patent Literature 2 discloses a secret similarity search technique using auxiliary information of a plaintext which relates and stores a hash value on a plaintext of storage encryption data and the storage encryption data. However, since the auxiliary information of the plaintext is direct partial information of the plaintext of the storage encryption data, there is a possibility that the plaintext of the storage encryption data may be guessed from the auxiliary information. Thus, even by using the method in Patent Literature 2, sufficient safety cannot be achieved.

Patent Literature 3 discloses a secret similarity search technique in a scheme whereby a similarity degree itself is not disclosed, but the similarity degree is disclosed only when the similarity degree is not more than a threshold value, or only whether a similarity degree falls not more than a threshold value or not is disclosed. However, similarity calculation processing performed by a server in Patent Literature 3 is processing that is performed by using a plaintext of registered data. Therefore, the data stored is based on the premise that the data is not encrypted. That is, the server is not owned by a third party, but is a possession of the data registrant. Thus, there is a problem that when the data registrant does not own a server, it is impossible to request analysis to an outsider while protecting privacy.

The present invention is aimed at providing a secret search system capable of calculating a similarity degree from storage encryption data and search encryption data without using plaintext information at all, and outputting information representing whether the similarity degree falls not more than a threshold value or not.

Solution to Problem

A secret search system according to one aspect of the present invention includes:
a management device including
an encryption similarity calculation unit to calculate, by performing a homomorphic operation on storage encryption data being storage data encrypted using a homomorphic encryption, and search encryption data being search data encrypted using the homomorphic encryption, the search data being used in search of the storage data, an encryption similarity which is a similarity degree between the storage data and the search data being encrypted using the homomorphic encryption, and
an encryption result transmission unit to generate an encryption search result to represent whether or not the similarity degree is not more than a threshold value by using the encryption similarity, and to transmit the encryption search result generated, and
a search device including
a decryption unit to decrypt the encryption search result transmitted from the management device, and to output the encryption search result decrypted as a search result, and
an output unit to output search result information to represent whether the similarity degree is not more than the threshold value or not, based on the search result.

Advantageous Effects of Invention

A secret search system according to the present invention is equipped with a management device including an encryption similarity calculation unit to calculate an encryption similarity which is a similarity degree between storage data and search data being encrypted, by performing a homomorphic operation on storage encryption data and search encryption data, without using the storage data and the search data being plaintexts, and an encryption result transmission unit to generate an encryption search result representing whether a similarity degree is not more than a threshold value or not by using the encryption similarity, and to transmit the encryption search result generated. Further, the secret search system according to the present invention is equipped with a search device including a decryption unit to decrypt the encryption search result received from the management device to output as a search result, and an output unit to output search result information representing whether the similarity degree is not more than a threshold value or not based on the search result. Thus, by the secret search system according to the present invention, it is possible to calculate the encryption similarity encrypted from the storage encryption data and the search encryption data without using plaintexts, and to output the search result information representing whether the similarity degree is not more than the threshold value or not without outputting the similarity degree itself; hence, it is possible to provide a secret search system with higher security.

BRIEF DESCRIPTION OF DRAWINGS

FIG. 15 is a hardware configuration diagram of each device of the key generation device 200, the registration device 300, the search device 400 and the management devices 500 and 500a.

DESCRIPTION OF EMBODIMENTS

Figure 1:
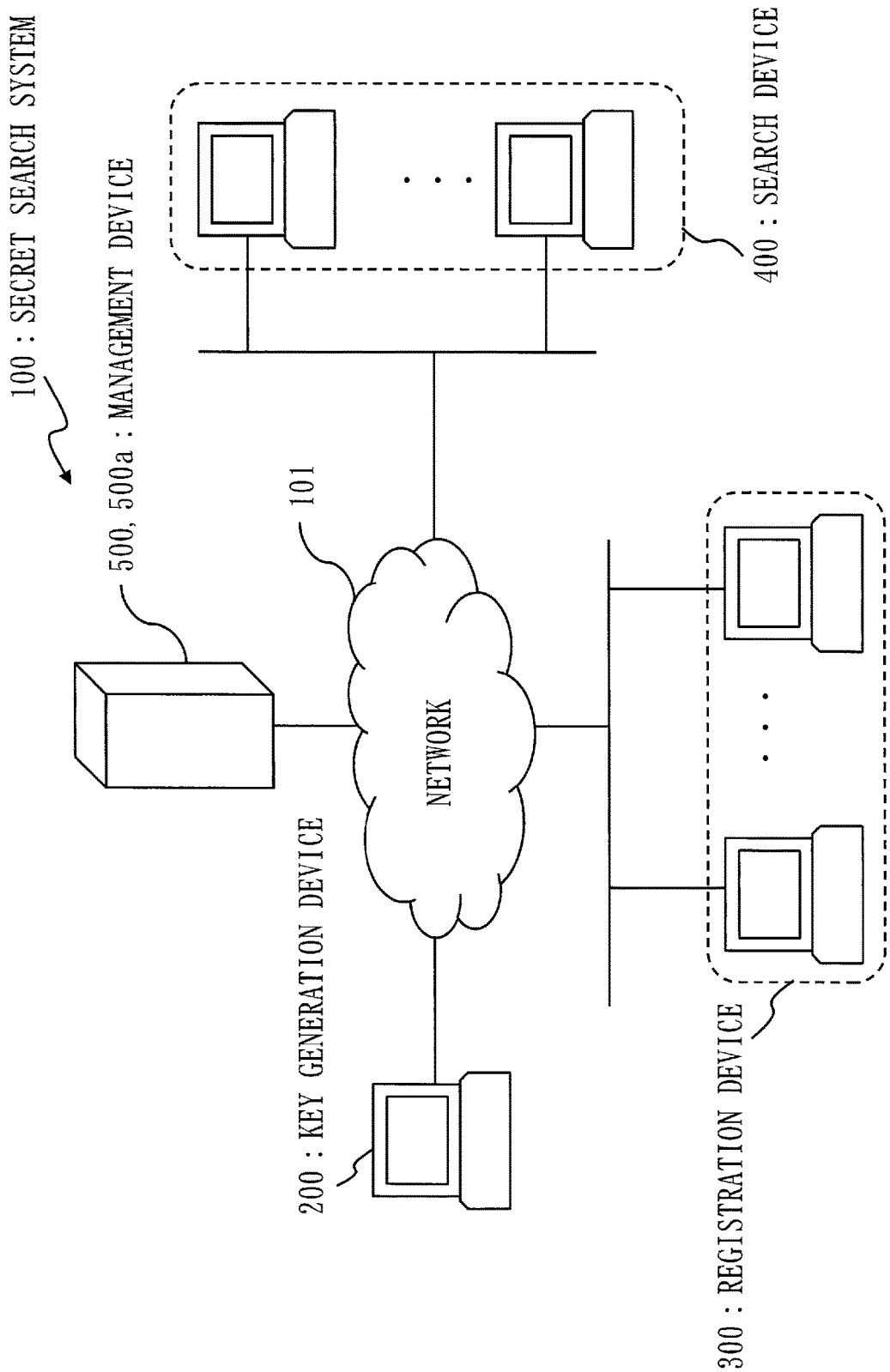
FIG. 1 is a system configuration diagram of a secret search system 100 according to a first embodiment.

Hereinafter, embodiments will be discussed using diagrams. Note that, in each diagram, the same parts or corresponding parts are denoted by the same signs. In the explanation of the embodiments, description of the same parts or the corresponding parts will be omitted or simplified as needed.

First Embodiment

In the present embodiment, a secret similarity search technique using a homomorphic encryption being one cryptographic technology will be described.

First, the homomorphic encryption and application thereof will be described.

The homomorphic encryption is a cryptographic technology whereby the four arithmetic operations can be performed without decrypting encryption data while keeping the encryption data in an encrypted state.

The ciphertexts obtained by encrypting a plaintext x and a plaintext y using the homomorphic encryption are to be written respectively as $E(x)$ and $E(y)$.

By the homomorphic encryption, when an operation is performed on $E(x)$ and $E(y)$, a ciphertext $E(x+y)$ whose plaintext is $(x+y)$ can be obtained. This is called homomorphic addition, and in the present embodiment, this operation is denoted by $\diamond$, to be expressed as $E(x) \diamond E(y) = E(x+y)$.

Further, when an operation is performed on $E(x)$ and $E(y)$, a ciphertext $E(x-y)$ whose plaintext is $(x-y)$ can be obtained. This is called homomorphic subtraction, and in the present embodiment, this operation is denoted by $\blacklozenge$, to be expressed as $E(x) \blacklozenge E(y) = E(x-y)$.

Furthermore, when an operation is performed on $E(x)$ and $E(y)$, a ciphertext $E(x*y)$ whose plaintext is $x*y$ can be obtained. This is called homomorphic multiplication, and in the present embodiment, this operation is denoted by $\square$, to be expressed as $E(x) \square E(y) = E(x*y)$.

Further, when an operation is performed on $E(x)$ and $E(y)$, a ciphertext $E(x/y)$ whose plaintext is $x/y$ can be obtained. This is called homomorphic division, and in the present embodiment, this operation is denoted by $\blacksquare$, to be expressed as $E(x) \blacksquare E(y) = E(x/y)$.

Note that in homomorphic encryptions, there is a homomorphic encryption wherein only homomorphic addition and homomorphic subtraction can be performed, and a homomorphic encryption wherein no limit is imposed on the number of times of homomorphic addition and homomorphic subtraction, but limits are imposed on the number of times of homomorphic multiplication and homomorphic division. Further, there is a homomorphic encryption wherein no limit is imposed both on homomorphic addition and homomorphic subtraction, as well as homomorphic multiplication and homomorphic subtraction.

As a specific example of the application of the homomorphic encryption, it is possible to calculate a ciphertext of a similarity degree while keeping the ciphertext in an encrypted state from storage encryption data stored in a server and search encryption data of a data searcher. In the following explanation, a ciphertext of a similarity degree may be called an encryption similarity.

First, a specific example 1 is discussed. By using the homomorphic encryption of the specific example 1, an example of obtaining a ciphertext of the squared Euclidean distance between (x1, x2) and (y1, y2), i.e., an encryption similarity in an encrypted state is explained. The squared Euclidean distance between (x1, x2) and (y1, y2) can be obtained by calculating (x1−y1)*(x1−y1)+(x2−y2)*(x2−y2). Here, x1, x2, y1 and y2 are integer numbers.

It is here assumed that storage encryption data is $E(x1, x2) = (E(x1), E(x2))$, and search encryption data is $E(y1, y2) = (E(y1), E(y2))$. That is, each ciphertext is a vector, having a ciphertext of each plaintext as a component.

At this time, in order to calculate the squared Euclidian distance, $T1 = E(x1-y1) = E(x1) \blacklozenge E(y1)$ and $T2 = E(x2-y2) = E(x2) \blacklozenge E(y2)$ are first calculated. Then, $T3 = T1 \square T1 = E((x1-y1)^2)$ and $T4 = T2 \square T2 = E((x2-y2)^2)$ are calculated. Finally, $T3 \diamond T4 = E((x1-y1)^2 + (x2-y2)^2)$ should be calculated.

Next, a specific example 2 is discussed. In the specific example 2, an example of obtaining an encryption similarity between storage encryption data E(x1, x2, x3) and search encryption data E(y1, y2) is explained. The homomorphic encryption in the specific example 2 is different to the homomorphic encryption in the specific example 1 as described above in that the homomorphic encryption in the specific example 2 can encrypt a vector of a plaintext at once, and represent the vector of the plaintext by one ciphertext.

In the first example of the specific example 2, the Hamming distance is used as a similarity degree, wherein the Hamming distance between (x1, x2) and (y1, y2) is S1, and the Hamming distance between (x2, x3) and (y1, y2) is S2. The first example of the specific example 2 is a method to efficiently calculate E(S1, S2) from the storage encryption data E(x1, x2, x3) and the search encryption data E(y1, y2). The Hamming distance between (x1, x2) and (y1, y2) can be obtained by calculating (x1−y1)*(x1−y1)+(x2−y2)*(x2−y2), similarly as the calculation method of the squared Euclidean distance. However, x1, x2, y1 and y2 are integer numbers being 0 or 1.

Further, in the second example of the specific example 2, by using a homomorphic encryption scheme capable only of homomorphic addition and homomorphic subtraction, an encryption Tversky index between plaintext data stored and a plaintext of search encryption data, i.e., an encryption similarity, is calculated. Further, from the encryption similarity calculated, a ciphertext whereby whether a similarity degree of a plaintext after decryption falls not more than a certain threshold or not is only recognizable, i.e., an encryption search result, is generated. However, since the second example of the specific example 2 is a scheme to obtain the encryption similarity between the plaintext data stored and the plaintext of the search encryption data, safety in terms of security is low.

\*\*\*Explanation of Configuration\*\*\*

Hereinafter, the present embodiment will be briefly described.

FIG. 1 is a diagram illustrating a system configuration of a secret search system 100 according to the present embodiment.

As illustrated in FIG. 1, the secret search system 100 is equipped with a key generation device 200, a plurality of registration devices 300, a plurality of search devices 400, and a management device 500. The management device 500a will be described in the second embodiment.

In the secret search system 100, each of the key generation device 200, the plurality of registration devices 300, the plurality of search devices 400 and the management device 500 are connected via a network 101.

The network 101 is a communication channel to connect the key generation device 200, the plurality of registration devices 300, the plurality of search devices 400 and the management device 500. The network 101 is, in particular, the Internet or a local area network (LAN), or other types of networks may be used.

The key generation device 200 generates a pair of a public key and a private key in the homomorphic encryption, and transmits the public key and the private key to the plurality of registration devices 300, the plurality of search devices 400 and the management device 500 via the network 101. The public key and the private key may be transmitted to the plurality of registration devices 300, the plurality of search devices 400 and the management device 500 directly by mail correspondence, not via the network 101. The key generation device 200 transmits only the public key to the plurality of registration devices 300 and the management device 500. The key generation device 200 transmits the public key and the private key to the plurality of search devices 400.

The registration devices 300 are, specifically, personal computers (PCs). The registration devices 300 are computers to operate as registration terminals to register storage encryption data to the management device 500.

The registration devices 300 function as encryption devices and registration devices. That is, the registration devices 300 generate storage encryption data, and request storage of the storage encryption data to the management device 500.

Further, the registration devices 300 function as deletion request devices. That is, the registration devices 300 request to the management device 500 deletion of the storage encryption data stored.

The search devices 400 are, specifically, PCs. The search devices 400 transmit search encryption data to the management device 500, and then receive an encryption search result from the management device 500. In addition, the search devices 400 are computers to operate as terminals to decrypt the encryption search result received.

The search devices 400 function as search request devices. That is, the search devices 400 transmit the search encryption data to the management device 500, and request calculation of an encryption similarity related to the storage encryption data and the search encryption data.

The search devices 400 function as decryption devices. That is, the search devices 400 decrypt the encryption search result returned from the management device 500.

The management device 500 is a device including a high-capacity storage medium to store the storage encryption data generated by the registration devices 300.

The management device 500 functions as a storage device. That is, the management device 500 stores storage encryption data when there is a request for storing the storage encryption data from the registration devices 300.

The management device 500 functions as a search execution device. That is, the management device 500 calculates an encryption similarity from the storage encryption data and the search encryption data when there is a request for search from the search devices 400, calculates an encryption search result from the encryption similarity, and transmits the encryption search result to the search devices 400.

The management device 500 functions as a deletion device. That is, the management device 500 deletes the storage encryption data stored when there is a request for deleting the storage encryption data from the registration devices 300.

At least two of the key generation device 200, the registration devices 300 and the search devices 400 may be included at the same time in a same PC.

The storage encryption data and the search encryption data are both encrypted. Further, the encryption similarity and the encryption search result are also encrypted. By a device not including a private key SK except for the search devices 400, beneficial information cannot be obtained from the storage encryption data, the search encryption data, the encryption similarity and the encryption search result.

Hereinafter, the configuration of the present embodiment will be discussed in detail.

As illustrated in FIG. 1, the secret search system 100 includes the key generation device 200, the registration devices 300, the search devices 400 and the management device 500. Hereinafter, the configuration of the key generation device 200, the configuration of the registration devices 300, the configuration of the search devices 400 and the configuration of the management device 500 will be discussed in order.

Figure 2:
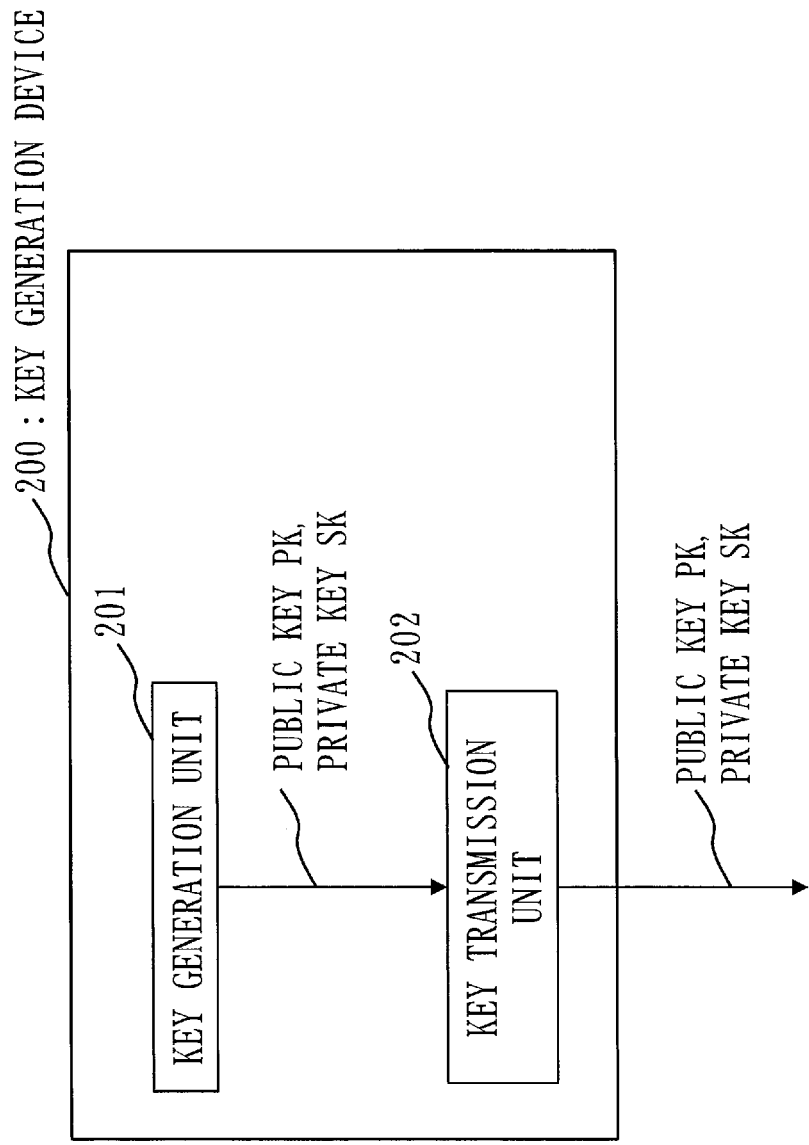
FIG. 2 is a block configuration diagram of a key generation device 200 according to the first embodiment.

FIG. 2 is a diagram illustrating a block configuration of the key generation device 200 according to the present embodiment.

As illustrated in FIG. 2, the key generation device 200 includes a key generation unit 201 and a key transmission unit 202. Further, the key generation device 200 includes a recording medium to store data to be used in each unit of the key generation device 200, which is not illustrated in the diagram.

The key generation unit 201 generates a public key PK and a private key SK in the homomorphic encryption for encrypting and decrypting data. Since the private key SK is secret information stored in the search devices 400, the private key SK is generated carefully. Although description is made in the present embodiment using the homomorphic encryption of a public-key cryptosystem, a homomorphic encryption of a common-key crypto system can be also used. In this regard, the key generation unit 201 generates only a private key SK=a public key PK. The private key SK is carefully stored in the registration devices 300, the search devices 400 and the management device 500.

The key transmission unit 202 transmits the public key PK generated by the key generation unit 201 to the registration devices 300 and the management devices 500. Further, the key transmission unit 202 transmits the pair of the public key PK and the private key SK generated by the key generation unit 201 to the search devices 400.

Figure 3:
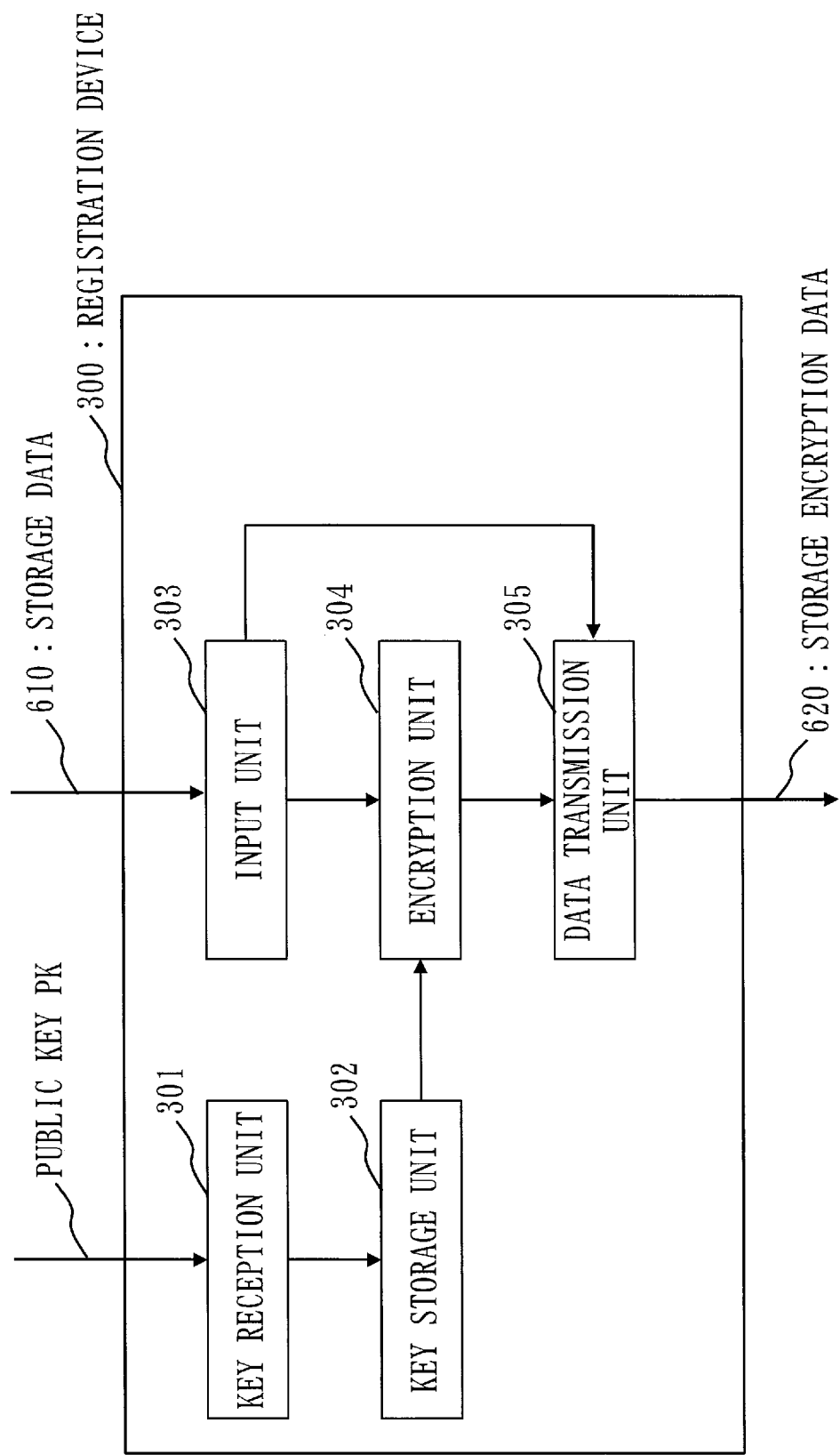
FIG. 3 is a block configuration diagram of a registration device 300 according to the first embodiment.

FIG. 3 is a diagram illustrating a block configuration of a registration device 300 according to the present embodiment.

As illustrated in FIG. 3, the registration device 300 includes a key reception unit 301, a key storage unit 302, an input unit 303, an encryption unit 304 and a data transmission unit 305. The registration device 300 includes a recording medium to store data to be used in each unit of the registration device 300, which is not illustrated in the diagram.

The key reception unit 301 receives the public key PK transmitted from the key generation device 200.

The key storage unit 302 stores the public key PK received by the key reception unit 301.

The input unit 303 receives storage data 610 input by a data registrant. In the present embodiment, explanation is made supposing that a vector (x1, x2, . . . , xk) (k is an integer number of k≥1) as the storage data 610 is received from the data registrant.

Further, the input unit 303 may receive, along with storage data 610, a storage data identifier on the storage data 610 from the data registrant. It suffices that the storage data identifier is specifically information whereby storage data is identifiable, such as a storage encryption data name, registered time, a name of the data registrant, etc.

Furthermore, the input unit 303 receives a deletion subject data identifier to identify storage encryption data desired to be deleted from the storage encryption data stored in the management device 500. It suffices that the deletion subject data identifier is specifically information whereby storage data is identifiable, such as a storage encryption data name, registered time, a name of the data registrant, etc.

The encryption unit 304 reads out the public key PK from the key storage unit 302, encrypts the storage data (x1, x2, . . . , xk) received from the input unit 303 with the public key PK, and generates storage encryption data 620. In the present embodiment, the storage encryption data 620 is represented as E(PK, x1, x2, . . . , xk).

As the homomorphic encryption in the specific example 2 as described above, when the homomorphic encryption whereby a vector can be encrypted at once is used, E(PK, x1, x2, . . . , xk) can be regarded as a kind of encryption. Meanwhile, when the homomorphic encryption as described in the specific example 1 above is used, it is necessary to perform encryption for each vector component. Thus, when the homomorphic encryption of the specific example 1 is used, E(PK, x1, x2, . . . , xk) is regarded as a vector (E(PK, x1), E(PK, x2), . . . , E(PK, xk)) of a ciphertext of each vector component.

The data transmission unit 305 transmits the storage encryption data E(PK, x1, x2, . . . , xk) received from the encryption unit 304 to the management device 500. If a storage data identifier is also input at the same time as the storage data by the data registrant, both of the storage encryption data and the storage data identifier are transmitted to the management device 500.

Further, the data transmission unit 305 transmits the deletion subject data identifier received from the input unit 303 to the management device 500.

Figure 4:
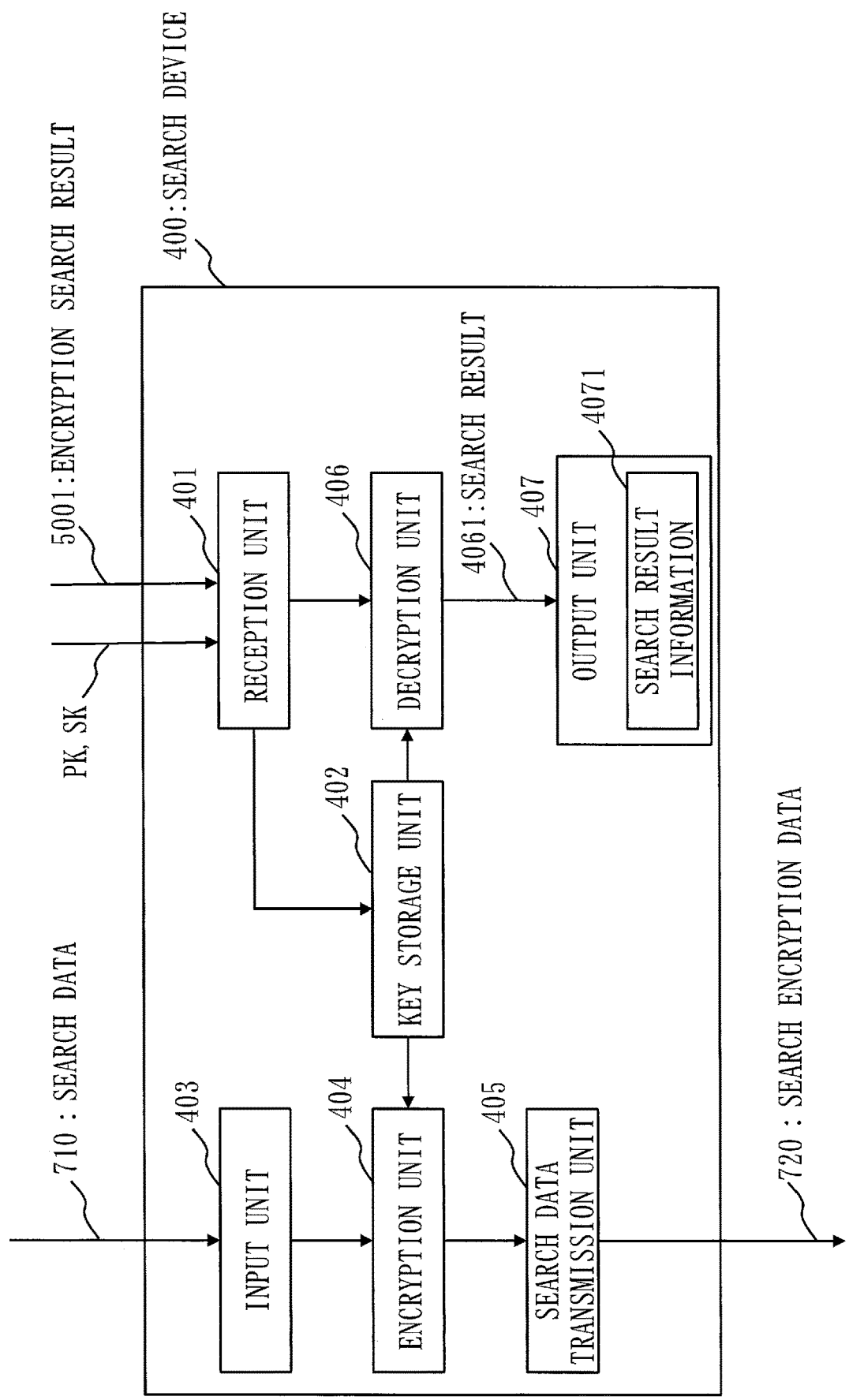
FIG. 4 is a block configuration diagram of a search device 400 according to the first embodiment.

FIG. 4 is a diagram illustrating a block configuration of a search device 400 according to the present embodiment.

As illustrated in FIG. 4, the search device 400 includes a reception unit 401, a key storage unit 402, an input unit 403, an encryption unit 404, a search data transmission unit 405, a decryption unit 406 and an output unit 407. The search device 400 includes a recording medium to store data used in each unit of the search device 400, which is not illustrated in the diagram.

The reception unit 401 receives the pair of the public key PK and the private key SK transmitted from the key generation device 200. Further, the reception unit 401 receives an encryption search result 5001 from the management device 500. The encryption search result 5001 may be one ciphertext or may be a plurality of ciphertexts depending on the contents of similarity calculation. The encryption search result 5001 is information to represent whether a similarity degree between storage data and search data is not more than a threshold value or not. However, the encryption search result 5001 is encrypted information representing whether the similarity degree between the storage data and the search data is not more than the threshold value or not, wherein the value of the similarity degree itself is not included.

The key storage unit 402 stores the pair of the public key PK and the private key SK received from the reception unit 401.

The input unit 403 receives search data 710 input by the data searcher. In the present embodiment, explanation is made supposing that a vector (y1, y2, . . . , ym) (m is an integer number of m≥1) as the search data 710 is received from the data searcher. The length m of the search data may be the same as, or may be different from a length n of the storage data. The value of m is determined depending on what kind of similarity calculation is desired by the data searcher.

Further, the input unit 403 may receive, along with the search data 710, a search subject data identifier to specify storage encryption data 620 to be searched for using the search data 710. The storage encryption data to be searched for using the search data 710 is storage encryption data being a subject for which a similarity degree is calculated using the search data 710. It suffices that the search subject data identifier is specifically information whereby storage encryption data is identifiable, such as a storage encryption data name, registered time, a name of the data registrant, etc.

The encryption unit 404 reads out the public key PK from the key storage unit 402, encrypts the search data 710, i.e., the vector (y1, y2, . . . , ym), received from the input unit 403 with the public key PK, and generates search encryption data 720. In the present embodiment, the search encryption data is represented as E (PK, y1, y2, . . . , ym).

The search data transmission unit 405 transmits the search encryption data 720, i.e., E (PK, y1, y2, . . . , ym), received from the encryption unit 404 to the management device 500. If the search subject data identifier is input in addition to the search data 710 by the data searcher, the search data transmission unit 405 transmits both of the search encryption data 720 and the search subject data identifier to the management device 500.

The decryption unit 406 decrypts the encryption search result 5001 transmitted from the management device 500, and outputs the encryption search result 5001 decrypted as a search result 4061.

The decryption unit 406 reads out the private key SK from the key storage unit 402, decrypts the encryption search result 5001 received from the reception unit 401, and extracts the search result 4061.

The output unit 407 outputs search result information 4071 to represent whether the similarity degree is not more than the threshold value θ or not based on the search result 4061.

The output unit 407 may output the search result 4061 received from the decryption unit 406 as it is to the data searcher.

Figure 5:
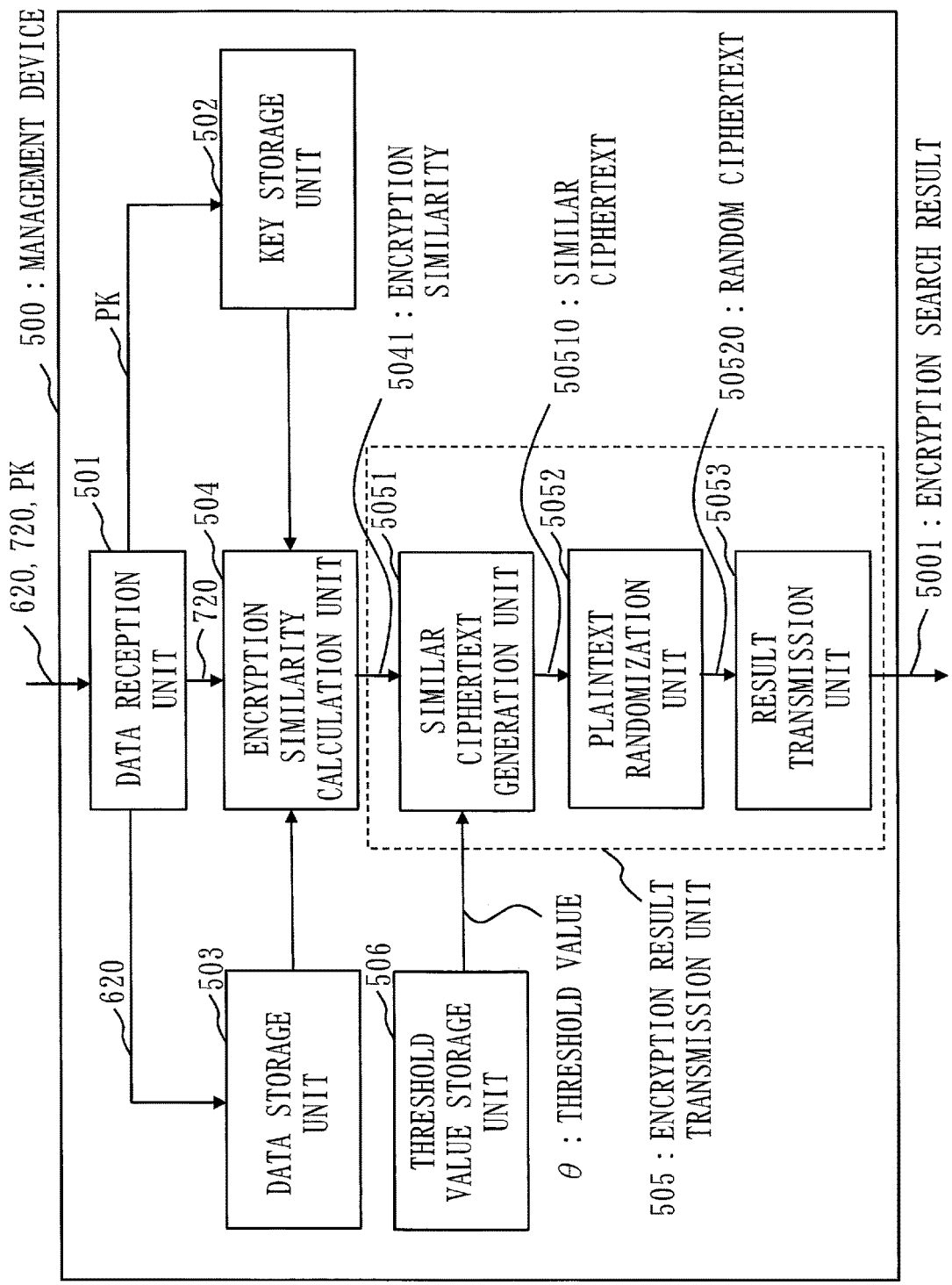
FIG. 5 is a block configuration diagram of a management device 500 according to the first embodiment.

FIG. 5 is a diagram illustrating a block configuration of the management device 500 according to the present embodiment.

As illustrated in FIG. 5, the management device 500 includes a data reception unit 501, a key storage unit 502, a data storage unit 503, an encryption similarity calculation unit 504, an encryption result transmission unit 505 and a threshold value storage unit 506. The encryption result transmission unit 505 includes a similar ciphertext generation unit 5051, a plaintext randomization unit 5052 and a result transmission unit 5053.

The management device 500 includes a recording medium to store data used in each unit of the management device 500, which is not illustrated in the diagram.

The data reception unit 501 receives the public key PK transmitted from the key generation device 200.

Further, the data reception unit 501 receives the search encryption data 720 being the search data 710 to be used in search of the storage data 610, and being the search data 710 encrypted using the homomorphic encryption.

The data reception unit 501 receives the storage encryption data 620, i.e., E(PK, x1, x2, . . . , xk), transmitted from the registration device 300. The data reception unit 501 may receive a storage data identifier and a deletion subject data identifier from the registration device 300 in addition to the storage encryption data E(PK, x1, x2, . . . , xk). Further, the data reception unit 501 may receive the search subject data identifier transmitted from the search device 400 in addition to the search encryption data E(PK, y1, y2, . . . , ym) as described above.

The key storage unit 502 stores the public key PK received from the data reception unit 501.

The data storage unit 503 stores the storage data 610 encrypted using the homomorphic encryption as storage encryption data 620.

The data storage unit 503 stores the storage encryption data E(PK, x1, x2, . . . , xk) received from the data reception unit 501 and the storage data identifier in an associated manner. If there is no storage data identifier, the data storage unit 503 generates a storage data identifier from a name of the data registrant or registered time, etc., as the storage data identifier, and stores the storage data identifier to be associated with the storage encryption data.

Further, the data storage unit 503 deletes the storage encryption data stored based on the deletion subject data identifier received from the data reception unit 501.

The encryption similarity calculation unit 504 calculates an encryption similarity 5041 wherein the similarity degree between the storage data and the search data is encrypted using the homomorphic encryption by performing the homomorphic operation on the storage encryption data 620 being the storage data encrypted using the homomorphic encryption, and the search encryption data 720 being the search data to be used in search of the storage data, and being the search data encrypted using the homomorphic encryption.

The encryption similarity calculation unit 504 receives the search encryption data E(PK, y1, y2, . . . , ym) and the search subject data identifier from the data reception unit 501. Further, the encryption similarity calculation unit 504 reads out the public key PK form the key storage unit 502. Then, the encryption similarity calculation unit 504 reads out the storage encryption data E(PK, x1, x2, . . . , xk) from the data storage unit 503 based on the search subject data identifier.

If there is no search subject data identifier, the storage encryption data 620 is thoroughly read out from the data storage unit 503.

Then, the encryption similarity calculation unit 504 calculates an encryption similarity 5041 by performing the homomorphic operation using the public key PK, each storage encryption data 620 and the search encryption data 720. The encryption similarity 5041 between the storage encryption data E(PK, x1, x2, . . . , xk) and the search encryption data E(PK, y1, y2, . . . , ym) is represented as E(PK, S1, S2, . . . , Sn).

As described above, when the squared Euclidian distance between (x1, x2) and (y1, y2) (k=m=2) is calculated by using the homomorphic encryption of the specific example 1, it is considered that n=1, and S1 is the squared Euclidian distance between (x1, x2) and (y1, y2). Further, when the similarity degree on the Hamming distance between (x1, x2, x3) (k=3) and (y1, y2) (m=2) is calculated by using the homomorphic encryption of the specific example 2, it is considered that n=2, S1 is the Hamming distance between (x1, x2) and (y1, y2), and S2 is the Hamming distance between (x2, x3) and (y1, y2).

The encryption result transmission unit 505 generates an encryption search result 5001 representing whether the similarity degree is not more than the threshold value or not using the encryption similarity 5041, and transmits the encryption search result 5001 generated.

The similar ciphertext generation unit 5051 generates a plurality of similar ciphertexts 50510, which are a plurality of plaintexts similar to the similarity degree, wherein when the similarity degree is not more than a threshold value, the plurality of plaintexts, at least one of which being 0, are respectively encrypted using the homomorphic encryption.

The similar ciphertext generation unit 5051 reads out the public key PK from the key storage unit 502, and reads out the threshold value θ from the threshold value storage unit 506. The similar ciphertext generation unit 5051 generates a plurality of ciphertexts having values similar to plaintexts (S1, S2, . . . , Sn) of the encryption similarity 5041 received from the encryption similarity calculation unit 504, using the homomorphic operation based on the public key PK and the threshold value θ. The ciphertexts generated are referred to as similar ciphertexts 50510, and each similar ciphertext is represented as E(PK, AS1, AS2, . . . , ASn).

The threshold value storage unit 506 stores the threshold value θ. In this regard, θ is an integer value equal to or larger than 1. The setting of the threshold value θ may be determined by the key generation device 200, or may be determined by the data registrant of the registration devices 300. Otherwise, the threshold value θ may be a value determined beforehand in the system. Moreover, there may be not only one threshold value, but a plurality of threshold values in accordance with the similarity degree to be calculated.

The plaintext randomization unit 5052 randomizes the plurality of plaintexts of the plurality of similar ciphertexts 50510, and generates an assembly of random ciphertexts which are the plurality of randomized plaintexts being respectively encrypted using the homomorphic encryption.

The plaintext randomization unit 5052 reads out the public key PK stored in the key storage unit 502, and randomizes each component of the plaintexts (AS1, AS2, . . . , ASn) of each similarity ciphertext E(PK, AS1, AS2, . . . , ASn) received from the similar ciphertext generation unit 5051. The plaintext randomization unit 5052 generates random ciphertexts 50520, wherein each component of the plaintexts (AS1, AS2, . . . , ASn) of each similarity ciphertext E(PK, AS1, AS2, . . . , ASn) are randomized. The random ciphertexts 50520 are represented as E(PK, R1, . . . , Rn).

The plaintext randomization unit 5052 randomizes a plaintext whose value is not 0 in the plurality of plaintexts while letting a plaintext with a value of 0 in the plurality of plaintexts be 0, and generates the assembly of the random ciphertexts 50520 wherein the plurality of plaintexts randomized are respectively encrypted using the homomorphic encryption.

That is, the plaintext randomization unit 5052 performs special randomization processing to convert ciphertexts whereof plaintexts are not 0 so that the plaintexts become random by using a plurality of random numbers not being 0 and the homomorphic operation, and to convert ciphertexts whereof plaintexts are 0 so that the plaintexts remain to be 0 without changing. Thus, the random ciphertexts E(PK, R1, . . . , Rn) are also referred to as respective-0-maintaining random ciphertexts E(PK, R1, . . . , Rn).

The result transmission unit 5053 generates an encryption search result 5001 by using the assembly of the random ciphertexts 50520 generated by the plaintext randomization unit 5052, and transmits the encryption search result 5001 generated. The result transmission unit 5053 transmits the assembly of the random ciphertexts 50520 received from the plaintext randomization unit 5052 as an encryption search result 5001 to the search devices 400.

\*\*\*Explanation of Operation\*\*\*

Figure 6:
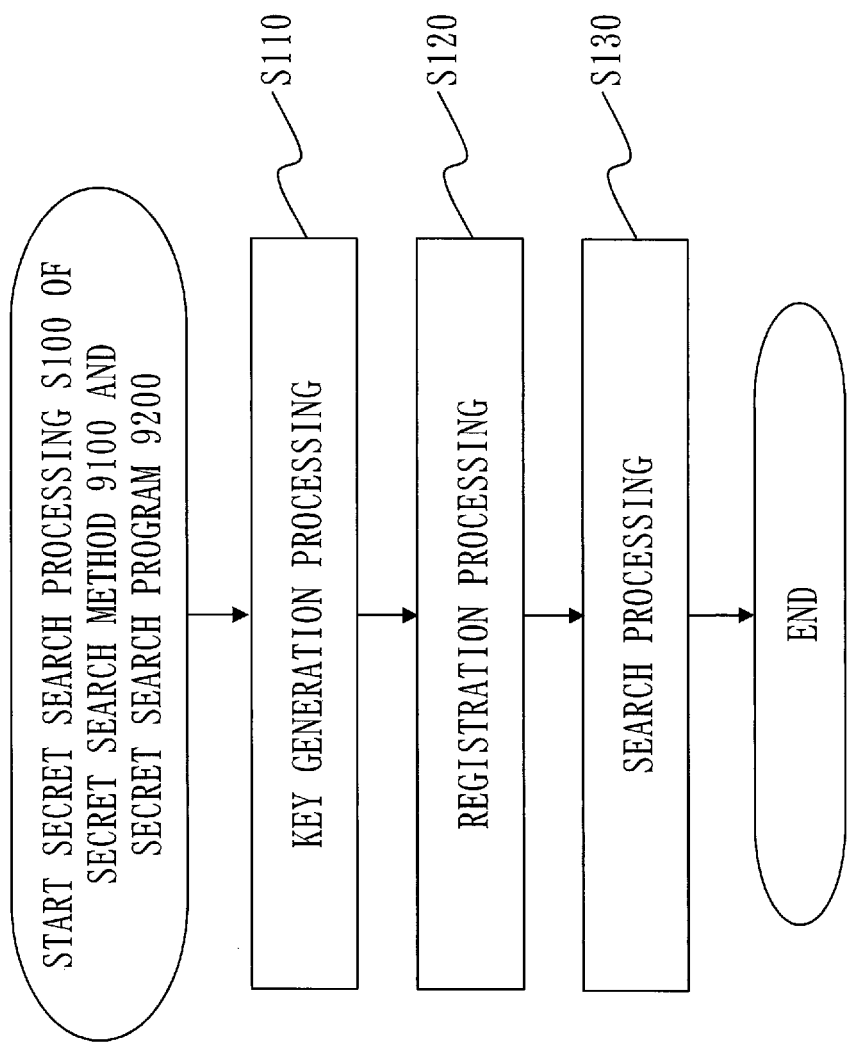
FIG. 6 is a flowchart illustrating secret search processing S100 of a secret search method 9100 and a secret search program 9200 of a secret search system 100 according to the first embodiment.

FIG. 6 is a flow diagram illustrating a flow of secret search processing S100 of a secret search method 9100 and a secret search program 9200 of the secret search system 100 according to the present embodiment.

The secret search processing S100 includes key generation processing S110, registration processing S120 and search processing S130.

The key generation processing S110 generates a key by the key generation device 200 and stores the key in each device.

The registration processing S120 encrypts storage data and stores the storage data encrypted as storage encryption data in the management device 500.

The search processing S130 calculates an encryption similarity between the search encryption data and the storage encryption data upon request from the search device, and generates an encryption search result to represent whether the similarity degree between the search data and the storage data is not more than a threshold value or not without using plaintext information.

Figure 7:
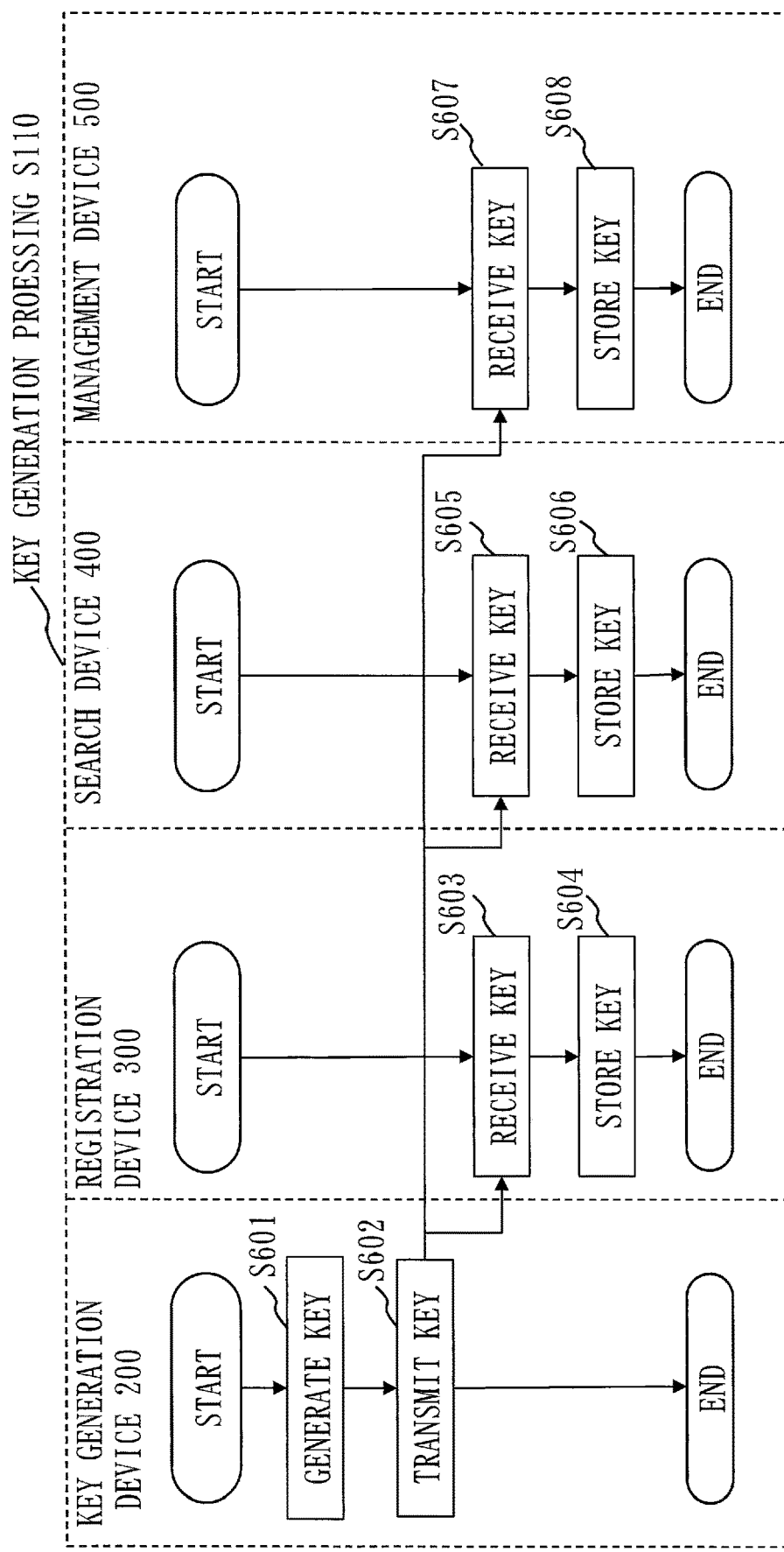
FIG. 7 is a flowchart illustrating key generation processing S110 of the secret search system 100 according to the first embodiment.

FIG. 7 is a flowchart illustrating the key generation processing S110 of the secret search system 100 according to the present embodiment.

S601 through S608 in FIG. 7 is processing performed by the key generation device 200, the registration devices 300, the search device 400 and the management device 500. S601 through S602 are performed by the key generation device 200. S603 through S604 are performed by the registration devices 300. S605 through S606 are performed by the search devices 400. S607 through S608 are performed by the management device 500.

<Processing of Key Generation Device 200>

In S601, the key generation unit 201 generates the public key PK and the private key SK in the homomorphic encryption for encryption and decryption of data. In this regard, description is made using the homomorphic encryption of a public-key cryptosystem; however, a homomorphic encryption of a common-key cryptosystem may be also used. In this case, it suffices that the key generation unit 201 sets the public key PK as a private key SK, and perform subsequent processing as in the case of the public-key cryptosystem.

In S602, the key transmission unit 202 transmits the public key PK generated in S601 to the registration devices 300 and the management device 500. Further, the key transmission unit 202 transmits the pair of the public key PK and the private key SK generated in S601 to the search devices 400.

<Processing of Registration Devices 300>

In S603, the key reception unit 301 receives the public key PK transmitted in S602.

In S604, the key storage unit 302 stores the public key PK received in S603 in a storage medium.

<Processing of Search Devices 400>

In S605, the reception unit 401 receives the pair of the public key PK and the private key SK transmitted in S602.

In S606, the key storage unit 402 stores the pair of the public key PK and the private key SK received in S605 in a storage medium. Since the private key SK is secret information, the private key SK is carefully stored so that the private key SK is not disclosed with the exception of the search devices 400 and a data searcher using the search devices 400.

<Processing of Management Device 500>

In S607, the data reception unit 501 receives the public key PK transmitted in S602.

In S608, the key storage unit 502 stores the public key PK received in S607 in a storage medium.

This concludes the key generation storage processing of the secret search system 100.

If the public key PK is equal to the private key SK, since the public key PK also becomes secret information, the key storage unit 302, the key storage unit 402 and the key storage unit 502 carefully store the public key PK together.

This concludes the key generation processing S110 of the secret search system 100.

Figure 8:
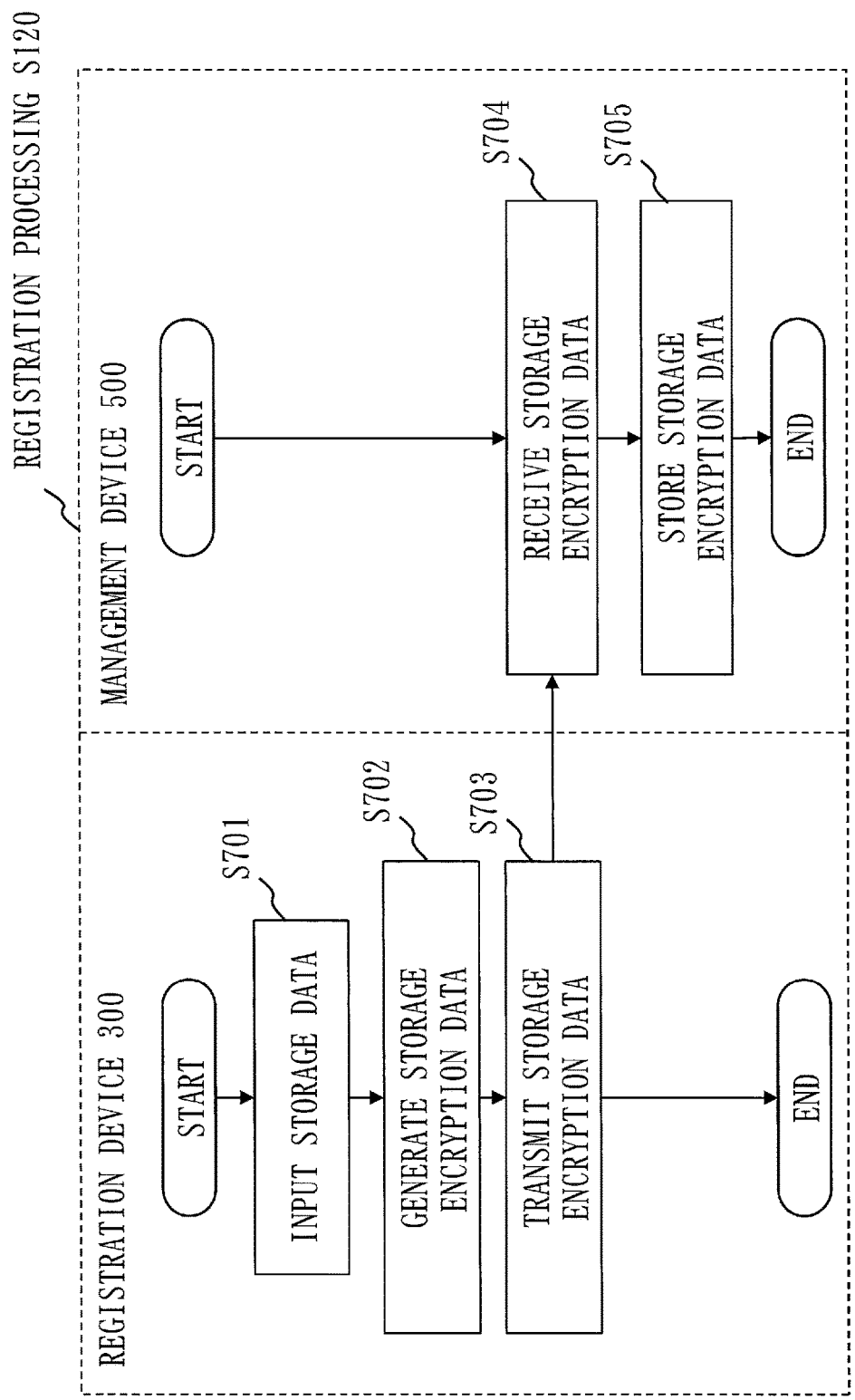
FIG. 8 is a flowchart illustrating registration processing S120 of the secret search system 100 according to the first embodiment.

FIG. 8 is a flowchart illustrating the registration processing S120 of the secret search system 100 according to the present embodiment.

S701 through S705 of FIG. 8 is processing performed by the registration devices 300 and the management device 500. S701 through S703 is processing performed by the registration devices 300. S704 through S705 is processing performed by the management device 500.

<Processing of Registration Devices 300>

In S701, the input unit 303 receives storage data (x1, x2, . . . , xk) (k≥1) input by the data registrant. The input unit 303 may receive, in addition to storage data, a storage data identifier related to the storage data as well from the data registrant.

In S702, the encryption unit 304 encrypts the storage data (x1, x2, . . . , xk) input in S701 with the public key PK stored in the key storage unit 302, and generates storage encryption data E(PK, x1, x2, . . . , xk).

In S703, the data transmission unit 305 transmits the storage encryption data E(PK, x1, x2, . . . , xk) generated in S702 to the management device 500. If the storage data identifier is also input in S702, the storage data identifier is also transmitted at the same time.

<Processing of Management Device 500>

In S704, the data reception unit 501 receives the storage encryption data E(PK, x1, x2, . . . , xk) transmitted in S703. If the storage data identifier is also transmitted in S704, the storage data identifier is also received.

In S705, the data storage unit 503 stores the storage encryption data E(PK, x1, x2, . . . , xk) received in S704. If the storage data identifier is also received in S704, the storage data identifier is stored in relation to the storage encryption data.

This concludes the registration processing S120 of the secret search system 100.

Figure 9:
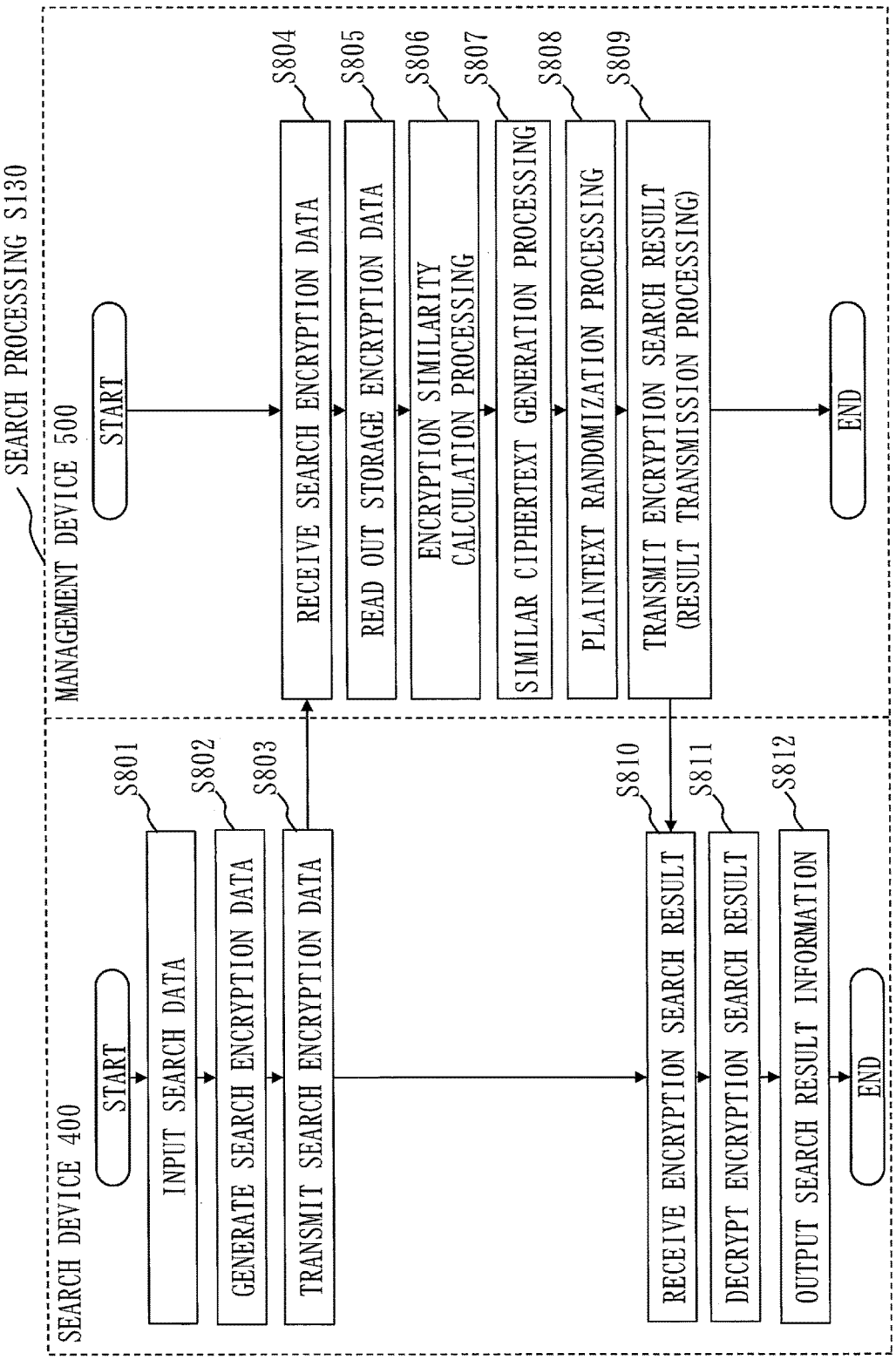
FIG. 9 is a flowchart illustrating search processing S130 of the secret search system 100 according to the first embodiment.

FIG. 9 is a flowchart illustrating the search processing S130 of the secret search system 100 according to the present embodiment.

S801 through S812 in FIG. 9 is processing performed by the search devices 400 and the management device 500. S801 through S803 and S810 through S812 is processing performed by the search devices 400. S804 through S809 is processing performed by the management device 500.

<Processing of Search Devices 400>

In S801, the input unit 403 receives the search data (y1, y2, ..., ym) input by the data searcher. The input unit 403 may receive a search subject data identifier indicating storage encryption data desired to be searched for in addition to the search data, from the data searcher.

In S802, the encryption unit 404 encrypts the search data (y1, y2, ..., ym) input in S801 with the public key PK stored in the key storage unit 402, and generates search encryption data E(PK, y1, y2, ..., ym).

In S803, the search data transmission unit 405 transmits the search encryption data E(PK, y1, y2, ..., ym) generated in S802 to the management device 500. If the search subject data identifier is also input in S801, the search subject data identifier is also transmitted at the same time.

<Processing of Management Device 500>

As mentioned above, the management device 500 stores the storage data 610 encrypted using the homomorphic encryption as storage encryption data 620.

<Data Reception Processing S804>

The data reception unit 501 performs data reception processing S804 to receive search encryption data 720 that is search data 710 used for search of the storage data 610, wherein the search data 710 is encrypted using the homomorphic encryption.

In the data reception processing S804, the data reception unit 501 receives the search encryption data E(PK, y1, y2, ..., ym) transmitted in S803. If the search subject data identifier is also transmitted in S803, the search subject data identifier is also received.

In S805, the encryption similarity calculation unit 504 reads out the storage encryption data E(PK, x1, x2, ..., xk) from the data storage unit 503. If the search subject data identifier is also received in S804, the encryption similarity calculation unit 504 reads out target storage encryption data based on the search subject data identifier received. If the search subject data identifier is not received in S804, the encryption similarity calculation unit 504 reads out storage encryption data thoroughly.

<Encryption Similarity Calculation Processing S806>

The encryption similarity calculation unit 504 performs encryption similarity calculation processing S806 to calculate an encryption similarity 5041 wherein a similarity degree between the storage data 610 and the search data 710 is encrypted using the homomorphic encryption by performing the homomorphic encryption on the storage encryption data 620 and the search encryption data 720.

In the encryption similarity calculation processing S806, the encryption similarity calculation unit 504 performs the homomorphic operation between each storage encryption data E(PK, x1, x2, ..., xk) read out in S805 and the search encryption data E(PK, y1, y2, ..., ym) received in S804, using the public key PK stored in the key storage unit 502, and calculates an encryption similarity E (PK, S1, S2, ..., Sn).

For example, the encryption similarity calculation unit 504 calculates an encryption similarity E(PK, S1, S2, ..., Sn) by calculating the squared Euclidean distance using the homomorphic encryption of the specific example 1 as described above.

Further, for example, the encryption similarity calculation unit 504 calculates an encryption similarity E(PK, S1, S2, ..., Sn) by calculating the Hamming distance using the homomorphic encryption of the specific example 2 as described above.

<Similar Ciphertext Generation Processing S807>

The similar ciphertext generation unit 5051 performs similar ciphertext generation processing S807 to generate a plurality of similar ciphertexts, which are a plurality of plaintexts similar to the similarity degree, wherein when the similarity degree is not more than a threshold value, the plurality of plaintexts, at least one of which being 0, are respectively encrypted using the homomorphic encryption.

In the similar ciphertext generation processing S807, the similar ciphertext generation unit 5051 reads out the public key PK from the key storage unit 502, and reads out the threshold value $\theta$ from the threshold value storage unit 506. The similar ciphertext generation unit 5051 generates a plurality of ciphertexts having values similar to the plaintexts (S1, S2, ..., Sn) of the encryption similarity 5041 received from the encryption similarity calculation unit 504, using homomorphic operation based on the public key PK and the threshold value $\theta$. Each of the plurality of ciphertexts generated here is the similar ciphertext E(PK, AS1, AS2, ..., ASn).

Specifically, the similar ciphertext generation unit 5051 generates $\theta+1$ pieces of similar ciphertexts 50510 using the public key PK stored in the key storage unit 502 and the threshold value $\theta$ stored in the threshold value storage unit 506. In this regard, the assembly of the similar ciphertexts 50510 generated are represented as $\{c0, c1, ..., c\theta\}$, and each c is represented as E(PK, AS1, AS2, ..., ASn). Further, the ciphertexts in the assembly of the similar ciphertexts are arranged in the order of c0, c1, ..., c$\theta$.

A specific generation method of similar ciphertexts will be discussed. By using the homomorphic addition, similar ciphertexts are generated as c0=E(PK, S1, S2, ..., Sn), c1=E(PK, −1+S1, −1+S2, ..., −1+Sn), ..., c$\theta$=E(PK, −$\theta$+S1, −$\theta$+S2, ..., −$\theta$+Sn).

The similar ciphertext generation processing S807 is processing to convert a ciphertext using the homomorphic operation if there is a plaintext Si with a similarity degree not more than $\theta$ in the encryption similarity E(PK, S1, S2, ..., Sn), and to generate at least one similar ciphertext wherein 0 appears as a plaintext.

In this regard, the zeroth similar ciphertext is a value obtained by subtracting 0 from the encryption similarity, the first similar ciphertext is a value obtained by subtracting 1 from the encryption similarity, ..., the $\theta$-th similar ciphertext is a value obtained by subtracting $\theta$ from the encryption similarity. That is, when the similarity degree is not more than the threshold value $\theta$, the similar ciphertext generation unit 5051 generates a plurality of similar ciphertexts which are a plurality of plaintexts, wherein a value-of-similarity-degree-number-ed plaintext from the top is 0, encrypted respectively using the homomorphic encryption.

<Plaintext Randomization Processing S808>

The plaintext randomization unit 5052 randomizes the plurality of plaintexts of the plurality of similar ciphertexts 50510, and performs plaintext randomization processing S808 to generate an assembly of the random ciphertexts 50520 which are the plurality of randomized plaintexts respectively encrypted using the homomorphic encryption.

In the plaintext randomization processing S808, the plaintext randomization unit 5052 randomizes plaintexts for each similar ciphertext c in the assembly of the similar ciphertexts generated in the similar ciphertext generation processing S807 with the public key PK stored in the key storage unit 502. The plaintext randomization unit 5052 generates θ+1 pieces of random ciphertexts as a result of randomization of the plaintexts for each similar ciphertext c. In this regard, the assembly of the random ciphertexts generated are represented as {C0, C1, . . . , Cθ}, and each random ciphertext C is represented as E(PK, R1, . . . , Rn). Further, the ciphertexts in the assembly of the random ciphertexts are arranged in the order of C0, C1, . . . , Cθ.

As described above, this randomization is special randomization processing, as mentioned above, to convert by using the homomoriphic operation similar ciphertexts whereof plaintexts are not 0 so that the plaintexts become random, and to convert similar ciphertexts whereof plaintexts are 0 so that the plaintexts remain to be 0 without changing.

Specifically, random numbers ri (i is an integer number that satisfies 0≤i≤θ) not being 0 are generated first. Then, C=E(PK, R1, R2, . . . , Rn)=E(PK, r1*AS1, r2*AS2, . . . , rn*ASn) is calculated by using the homomorphic operation for each similar ciphertext c=E(PK, AS1, AS2, . . . , ASn). If ASi is 0, the value remains to be 0 even when being multiplied by the random numbers ri.

If there is a plaintext Si whereof similarity degree is not more than θ in the encryption similarity E(PK, S1, S2, . . . , Sn), as a result of converting ciphertexts by using the homomorphic operation in the similar ciphertext generation processing S807, the value becomes 0 as a plaintext, i.e., a ciphertext with ASi=0 is generated. Thus, Ri (=ri*ASi) is stored while it remains to be 0 even when randomization is performed by the plaintext randomization unit 5052. When Ri (=ri*ASi) is stored while it remains to be 0, 0 appears by decrypting random ciphertexts E.

By taking contraposition, if plaintexts not being 0 only appear, i.e., when 0 does not appear even by decryption, it becomes clear that the value of the similarity degree Si is unclear, but only a fact that the similarity degree Si is not equal to nor smaller than the threshold value.

<Result Transmission Processing S809>

The result transmission unit 5053 generates an encryption search result 5001 to represent whether the similarity degree is not more than the threshold value θ or not by using the assembly of the random ciphertexts 50520 generated in the plaintext randomization processing S808, and performs result transmission processing S809 to transmit the encryption search result 5001 generated.

The result transmission unit 5053 transmits the assembly {C0, C1, . . . , Cθ} of the random ciphertexts generated in the plaintext randomization processing S808 as the encryption search result 5001 to the search devices 400.

<Processing of Search Devices 400>

In S810, the reception unit 401 receives the encryption search result 5001 transmitted in the result transmission processing S809, i.e., the assembly {C0, C1, . . . , Cθ} of the random ciphertexts.

In S811, the decryption unit 406 decrypts the encryption search result {C0, C1, . . . , Cθ} received in the result transmission processing S809 with the private key SK stored in the key storage unit 402, and obtains a search result 4061.

In S812, based on the search result 4061, the output unit 407 judges whether there is a plaintext with a value of 0 in a plurality of plaintexts, and when it is judged that there is a plaintext with a value of 0, the output unit 407 outputs search result information 4071 to indicate that the similarity degree is not more than the threshold value θ. Further, when it is judged that there is no plaintext with a value of 0 in the plurality of plaintexts, the output unit 407 outputs search result information 4071 to indicate that the similarity degree is larger than the threshold value θ.

Further, when it is judged that there is a plaintext with a value of 0 in the plurality of plaintexts, the output unit 407 obtains an order of the plaintext with the value of 0 in the plurality of plaintexts. The output unit 407 may identify the order obtained with a similarity degree, and output the similarity degree identified.

By S812, the search processing of the secret search system 100 ends.

<Explanation of Specific Example 10 of Search Processing>

Based on the homomorphic encryption of the specific example 1 as described above, a specific example 10 of search processing S130 of the present embodiment will be described. It is described supposing that storage data is (0, 0, 1), search data is (0, 0, 0), and θ=1. In this regard, the squared Euclidean distance between the storage data and the search data is 1. In the present embodiment, it is desired to convey to a data searcher a similarity degree between the storage data and the search data is 1.

In S801, the input unit 403 receives (0, 0, 0) as search data of the data searcher.

In S802, the encryption unit 404 calculates search encryption data E(PK, 0, 0, 0)=(E(PK, 0), E(PK, 0), E(PK, 0)) with the public key PK.

In S803, the search data transmission unit 405 transmits the search encryption data E(PK, 0, 0, 0) to the management device 500.

In S804, the data reception unit 501 receives the search encryption data E(PK, 0, 0, 0).

In S805, the encryption similarity calculation unit 504 reads out storage encryption data E(PK, 0, 0, 1)=(E(PK, 0), E(PK, 0), E(PK, 1)).

In S806, the encryption similarity calculation unit 504 calculates an encryption similarity E(PK, 1).

In S807, the similar ciphertext generation unit 5051 performs the homomorphic subtraction, and generates two pieces of ciphertexts E(PK, 1-0)=E(PK, 1) and E(PK, 1-1)=E(PK, 0) from E(PK, 1). That is, {c0, c1}={E(PK, 1), E(PK, 0)} is generated.

In S808, the plaintext randomization unit 5052 generates random numbers r0 and r1 not being 0, performs the homomorphic addition, and calculates {C0, C1} as in the following formula 1 and formula 2.

$$C0 = E(PK, R0) = r0 * c0 = E(PK, 1) \diamond \ldots \diamond E(PK, 1) = E(PK, r0) \quad \text{Formula 1}$$

$$C1 = E(PK, R1) = r1 * c1 = E(PK, 0) \diamond \ldots \diamond E(PK, 0) = E(PK, 0) \quad \text{Formula 2}$$

In S809, the result transmission unit 5053 transmits {E(PK, r0), E(PK, 0)}.

In S810, the reception unit 401 receives {E(PK, r0), E(PK, 0)}.

In S811, the decryption unit 406 decrypts E(PK, r0) and E(PK, 0) with the private key SK and obtains r0 and 0 as plaintexts.

In S812, since 0 appears by decryption, the output unit 407 displays search result information 4071 to represent that the similarity degree (squared Euclidean distance) between the plaintext (0, 0, 1) of the storage encryption data and the search data (0, 0, 0) is 1 to a display device, etc. The data searcher can recognize that the similarity degree (squared Euclidean distance) is 1 from the search result information 4071 displayed.

<Explanation of Specific Example 20 of Search Processing>

Next, a specific example 20 of the search processing will be described as an example different from the specific example 10 of the search processing. It is described supposing that storage data is (0, 1, 1), search data is (0, 0, 0) and θ=1. In this regard, the squared Euclidean distance between the storage data (0, 1, 1) and the search data (0, 0, 0) is 2. In the present embodiment, since the similarity degree is equal to or larger than the threshold value θ, it is desired to convey to the data searcher the fact that the similarity degree between the storage data and the search data is larger than the threshold value.

The processing from S801 through S805 is omitted.

In S806, the encryption similarity calculation unit 504 calculates E(PK, 2) as an encryption similarity.

In S807, the plaintext randomization unit 5052 generates E(PK, 2-0)=E(PK, 2) and E(PK, 2-1)=E(PK, 1).

In S808, the plaintext randomization unit 5052 generates random numbers r0 and r1, performs the homomorphic addition, and generates C0=E(PK, R0)=E(PK, 2*r0) and C1=E(PK, R1)=E(PK, r1).

In S809, the result transmission unit 5053 transmits {E(PK, 2*r0), E(PK, r1)}.

In S810, the reception unit 401 receives {E(PK, 2*r0), E(PK, r1)}.

In S811, the decryption unit 406 decrypts E(PK, 2*r0) and E(PK, r1) with the private key SK, and obtains 2*r0 and r1 as plaintexts.

In S812, since 0 does not appear by decryption, the output unit 407 displays search result information 4071 to represent that the similarity degree (squared Euclidean distance) between the plaintext (0, 1, 1) of the storage encryption data and the search data (0, 0, 0) is larger than the threshold value θ. In this regard, the value (=2) of the similarity degree itself does not appear, and is not displayed, in the course of search processing. Thus, the data searcher can only obtain the random numbers 2*r0 and r1 even by decryption. Therefore, the data searcher can only recognize the fact that the similarity degree between the storage data and the search data is larger than the threshold value 1.

Although explanation is made in the above example using the squared Euclidean distance as the similarity degree, other indexes of the similarity degree may be used. Specifically, it is possible to perform processing on storage data and search data while both the storage data and the search data remain encrypted also by the Lp-norm or Tversky index, etc. by using the methods as described in the present embodiment.

Figure 10:
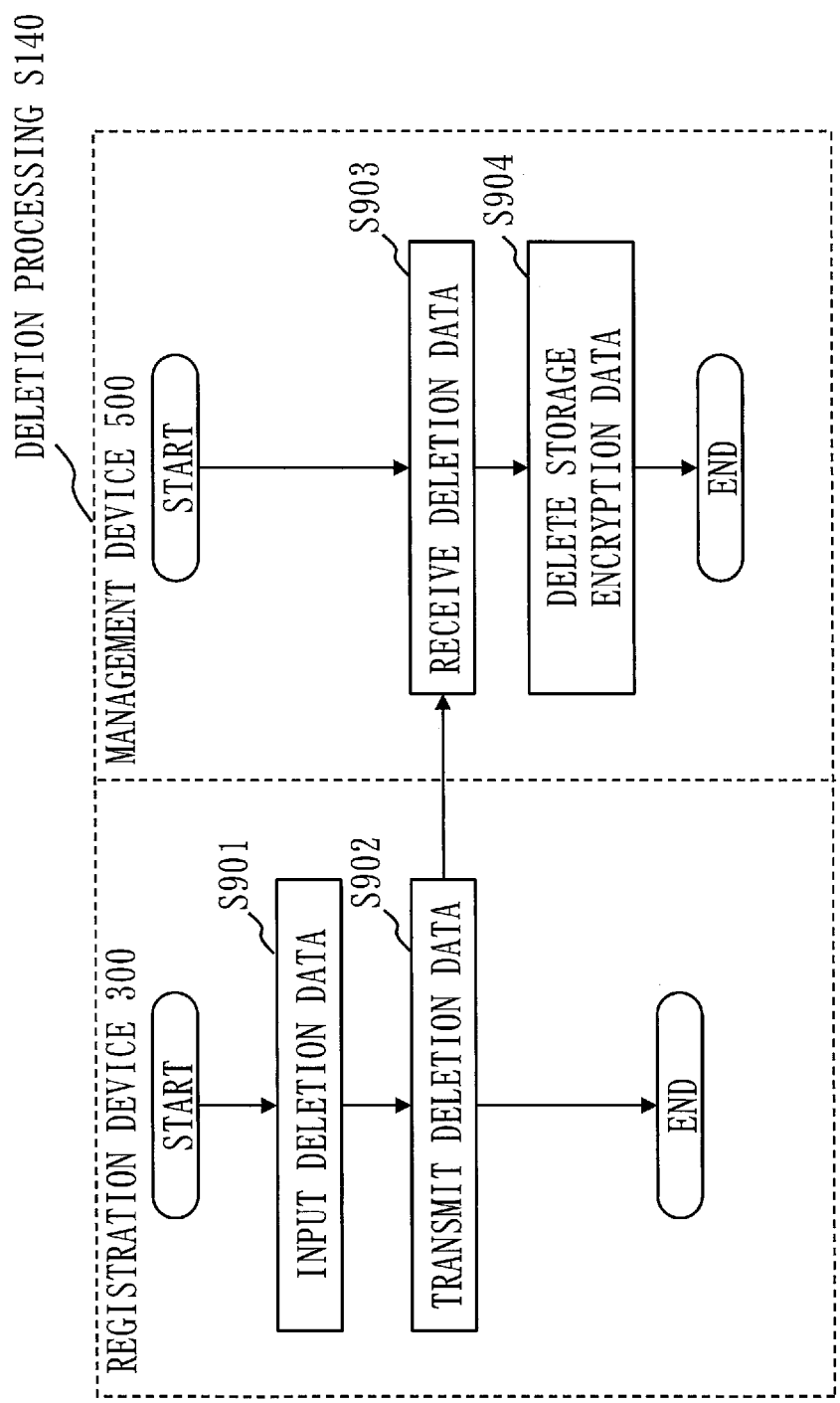
FIG. 10 is a flowchart illustrating deletion processing S140 of the secret search system 100 according to the first embodiment.

FIG. 10 is a flowchart illustrating deletion processing S140 of the secret search system 100 according to the present embodiment.

S901 through S904 in FIG. 10 is processing to be performed by the registration devices 300 and the management device 500. S901 through S902 is processing performed by the registration devices 300. S903 through S904 is processing performed by the management device 500.

<Processing Registration Devices 300>

In S901, the input unit 303 receives a deletion subject data identifier for storage encryption data desired to be deleted, from a data registrant. As described above, the deletion subject data identifier may be anything as long as the storage data as a subject of deletion can be identified.

In S902, the data transmission unit 305 transmits the deletion subject data identifier input in S901.

<Processing of Management Processing 500>

In S903, the data reception unit 501 receives the deletion subject data identifier transmitted from the registration devices 300 in S902.

In S904, the data storage unit 503 deletes the storage encryption data stored based on the deletion subject data identifier received in S903.

By S904, the deletion processing of the secret search system 100 ends.

\*\*\*Explanation of Effects According to Present Embodiment\*\*\*

The present embodiment has effects as follows.

By the secret search system 100 according to the present embodiment, since the storage data is stored in an encrypted state, even when the storage encryption data is leaked from the management device 500, the contents of the storage data itself will not be notified.

Further, by the secret search system 100 according to the present embodiment, since processing can be performed while not only the search data but also the storage data remain encrypted, it is possible to attain more secure secret similarity search.

Furthermore, by the secret search system 100 according to the present embodiment, since secret similarity search can also be attained by using public-key cryptography, a private key needs not be shared between a data registrant and a data searcher, and the roles of the data registrant and the data searcher can be separated.

Further, by the secret search system 100 according to the present embodiment, the output unit of the search device outputs an accurate value of a similarity degree if the similarity degree is not more than a threshold value, and when the similarity degree surpasses the threshold value, outputs only information that the similarity degree surpasses the threshold value. Thus, the data searcher cannot recognize a correct value of the similarity degree when the similarity degree surpasses the threshold value, and cannot guess a plaintext of the storage encryption data from the similarity degree.

Further, according to the secret search system 100 according to the present embodiment, by generating some similar ciphertexts and performing special randomization on those similar ciphertexts, it is possible to output the correct value of the similarity degree when the similarity degree is not more than the threshold value, and to output only information that the similarity degree surpasses the threshold value when the similarity degree surpasses the threshold value.

Further, by the secret search system 100 according to the present embodiment, it becomes possible for the management device to calculate ciphertexts of the similarity degree while letting the storage data and the search data remain in an encrypted state, and by disrupting the ciphertexts, to output only information whether the similarity degree is not more than the threshold value or not.

As described above, by the secret search system 100 according to the present embodiment, it is possible to calculate the similarity degree from storage encryption data and search encryption data without using plaintext information at all. Further, by the secret search system 100 according to the present embodiment, it is possible to disclose to a data searcher, without disclosing the similarity degree itself, a similarity degree only when the similarity degree is not more than a threshold value, or only the fact that the similarity degree is not more than a threshold value or not.

*Other Configuration*

The secret search system 100 may include a plurality of key generation devices 200. Further, the secret search system 100 may include only one registration device 300. Furthermore, the secret search system 100 may include only one search device 400. The secret search system 100 may include a plurality of management devices 500.

It is also acceptable that each of the key generation device 200, the plurality of registration devices 300, the plurality of search devices 400 and the management device 500 is not connected via the network 101, but is installed in a local area network (LAN) set in the same company.

It is also acceptable that in the configuration, at least two of the key generation device 200, the registration devices 300 and the search devices 400 may be included in the same PC.

Second Embodiment

In the present embodiment, the parts different from those in the first embodiment will be mainly discussed.

By the secret search system 100 according to the first embodiment, when a similarity degree between storage data and search data is not more than a threshold value, a data searcher can recognize the similarity degree itself. However, in the present embodiment, it is described a secret search system 100 aiming at making it possible for a data searcher to recognize only that a similarity degree is not more than a threshold value even when the similarity degree is not more than the threshold value.

*Explanation of Configuration*

Figure 11:
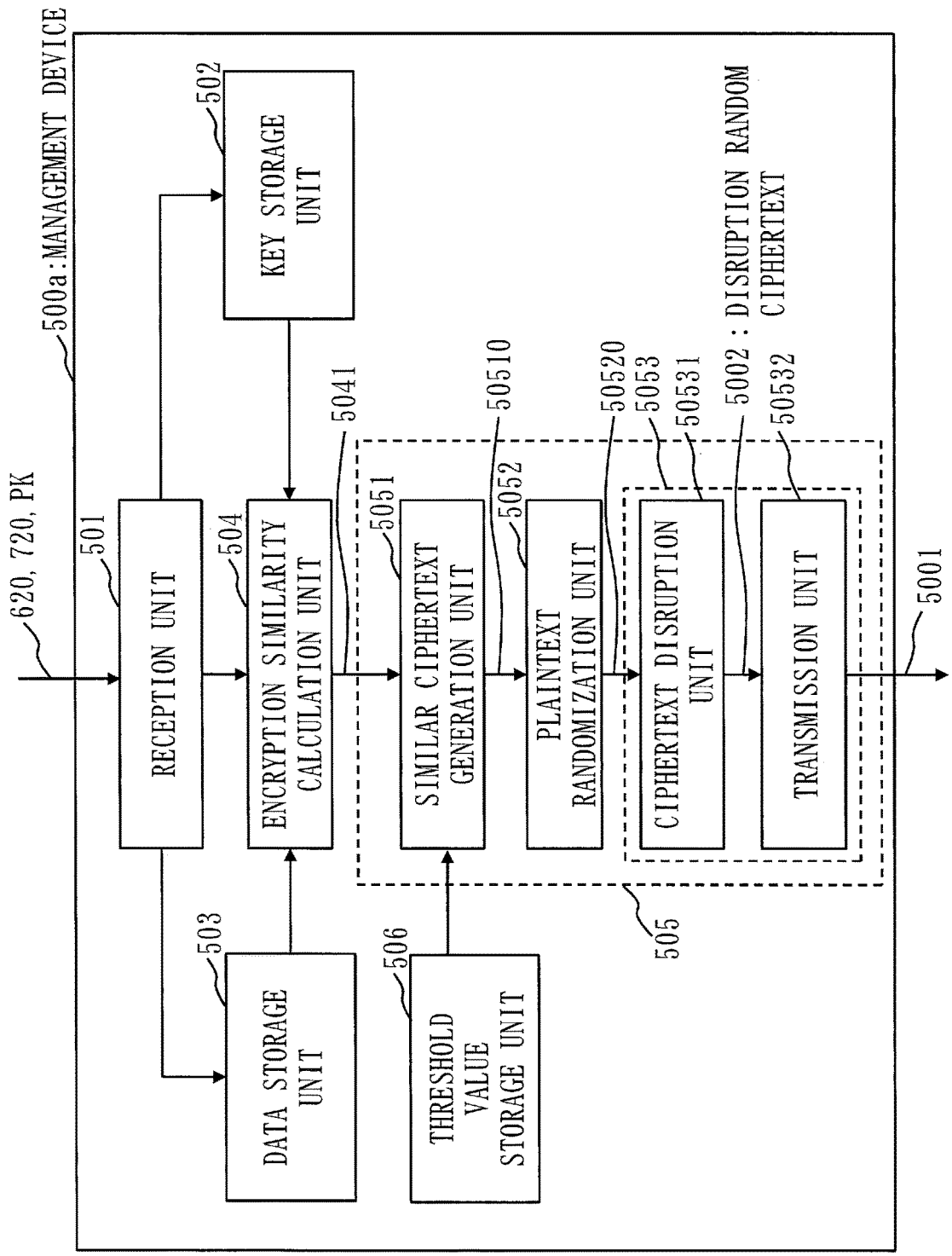
FIG. 11 is a block configuration diagram of a management device 500a according to a second embodiment.

FIG. 11 is a block diagram illustrating a configuration of a management device 500 according to the present embodiment.

In the present embodiment, component parts having similar functions as the component parts described in the first embodiment are denoted by the same signs, and the explanation is omitted.

In the present embodiment, a result transmission unit 5053 includes a ciphertext disruption unit 50531 and a transmission unit 50532.

The ciphertext disruption unit 50531 disrupts an assembly of random ciphertexts 50520 generated by a plaintext randomization unit 5052, and generates the assembly of the random ciphertexts 50520 disrupted as a disruption random ciphertext 5002.

Specifically, the ciphertext disruption unit 50531 disrupts the assembly of the random ciphertexts 50520 by changing, in the assembly of the random ciphertexts 50520, the order of the random ciphertexts 50520 in the assembly of the random ciphertexts 50520. The ciphertext disruption unit 50531 generates the assembly of the random ciphertexts 50520 wherein the order has been changed as disruption random ciphertext 5002.

The ciphertext disruption unit 50531 reads out a public key PK stored in a key storage unit 502, performs disruption processing on random ciphertexts E(PK, R1, . . . , Rn) received from the plaintext randomization unit 5052, and generates the disruption random ciphertext 5002. There may be one disruption random ciphertext 5002, or may be a plurality of disruption random ciphertexts 5002.

The processing of the ciphertext disruption unit 50531 is performed so as not to let a similarity degree itself appear even by decrypting an encryption search result. That is, the processing is final processing in order to convert into a ciphertext whereby only whether or not the similarity degree is not more than a threshold value or not can be identified. Specifically, it is performed converting the order of each random ciphertext in the assembly of the random ciphertexts 50520, i.e., converting the order randomly, replacing the components between the random ciphertexts randomly, or combining the random ciphertexts into one ciphertext by performing the homomorphic operation. The specific processing will be described below.

The transmission unit 50532 transmits the assembly of the disruption random ciphertexts 5002 generated by the ciphertext disruption unit 50531 as the encryption search result 5001 to the search devices 400.

An output unit 407 of the search devices 400 judges whether a plaintext with a value of 0 exists in a plurality of plaintexts, and when it is judged that the plaintext with the value of 0 exists, outputs search result information 4071 to represent that the similarity degree is not more than the threshold value θ. Further, when it is judged that the plaintext with a value of 0 does not exist in the plurality of plaintexts, the output unit 407 of the search devices 400 outputs search result information 4071 to represent that the similarity degree is larger than the threshold value θ.

*Explanation of Operation*

Figure 12:
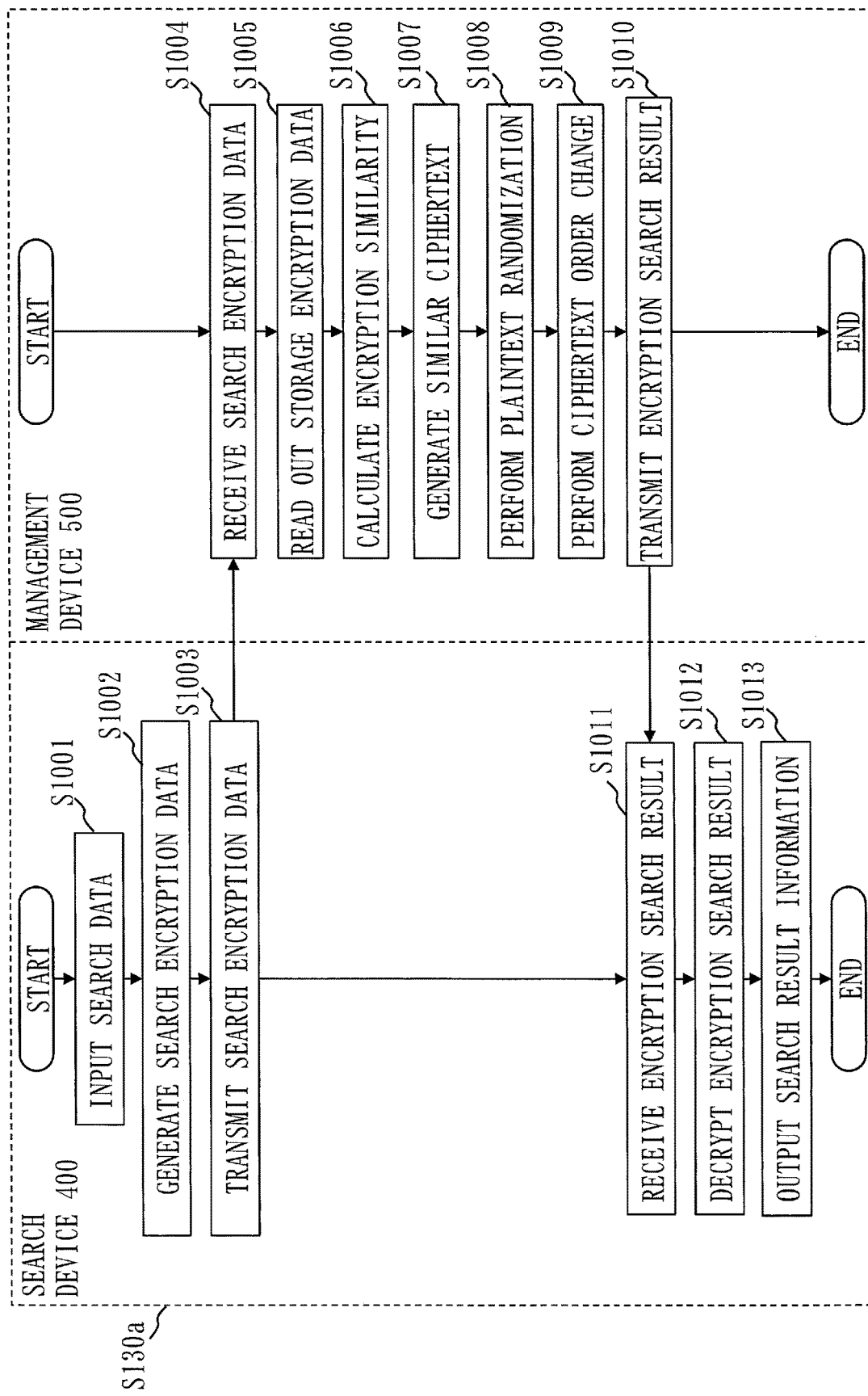
FIG. 12 is a flowchart illustrating search processing S130a of a secret search system 100 according to the second embodiment.

FIG. 12 is a flowchart illustrating search processing S130a of the secret search system 100 in the present embodiment.

In the present embodiment, it is described the secret search system 100 which makes it difficult to let a similarity degree be known, and which improves security further, by performing search processing by using a replace function π: $\{0, 1, \ldots, \theta\} \rightarrow \{0, 1, \ldots, \theta\}$.

In the operation of the secret search system 100 of the present embodiment, the parts different from those in the first embodiment are only a part of the search processing.

S1001 through S1013 of FIG. 12 is processing performed by search devices 400 and a management device 500. S1001 through S1003 and S1011 through S1013 are processing performed by the search devices 400. S1004 through S1010 is processing performed by the management device 500.

S1001 through S1008 in the search processing S130a of the present embodiment is similar to the processing in S801 through S808 of the first embodiment, the explanation is omitted.

<Processing of Management Device 500>

In S1009, the ciphertext disruption unit 50531 performs randomly order change of random ciphertexts on the assembly $\{C0, C1, \ldots, C\theta\}$ of the random ciphertexts generated in S1008, and generates an assembly of disruption random ciphertexts. It is assumed that the result of the order change can be represented as $\{C\pi(0), C\pi(1), \ldots, C\pi(\theta)\}$ by using the replace function π: $\{0, 1, \ldots, \theta\} \rightarrow \{0, 1, \ldots, \theta\}$, and the order of the disruption random ciphertexts is such that the disruption random cipher texts are arranged in this manner. If $\pi(i)=\pi(j)$, $i=j$ is obtained.

In S1010, the transmission unit 50532 transmits the assembly $\{C\pi(1), C\pi(2), \ldots, C\pi(\theta)\}$ of the disruption random ciphertexts generated in S1009 as an encryption search result 5001 to the search devices 400.

<Processing of Search Devices 400>

In S1011, a reception unit 401 receives the encryption search result $\{C\pi(1), C\pi(2), \ldots, C\pi(\theta)\}$ transmitted in S1010.

In S1012, a decryption unit 406 decrypts the encryption search result $\{C\pi(1), C\pi(2), \ldots, C\pi(\theta)\}$ received in S1011 with a private key SK stored in a key storage unit 402, and obtains a search result 4061.

In S1013, an output unit 407 outputs search result information 4071 to a data searcher based on a result of judging the search result obtained in S1012.

The output unit 407 judges whether there is a plaintext with a value of 0 in a plurality of plaintexts of the disruption random ciphertexts by using the search result 4061, and when it is judged that the plaintext with the value of 0 exists, outputs search result information 4071 to represent that the similarity degree is not more than the threshold value θ. Further, when it is judged that the plaintext with the value of 0 does not exist in the plurality of plaintexts of the disruption random ciphertexts, the output unit 407 outputs search result information 4071 to represent that the similarity degree is larger than the threshold value θ.

In S1013, the search processing of the secret search system 100 ends.

<Explanation of Specific Example 30 of Search Processing>

Based on the homomorphic encryption of the specific example 1 as described above, a specific example 30 of the search processing of the present embodiment will be described. In this regard, explanation is made supposing that storage data is (0, 0, 1), search data is (0, 0, 0) and θ=1. The squared Euclidean distance between the storage data (0, 0, 1) and the search data (0, 0, 0) is 1. In the present embodiment, it is desired to convey to the data searcher only that the similarity degree between the storage data and the search data is not more than 1.

In S1006, an encryption similarity calculation unit 504 calculates an encryption similarity E(PK, 1).

In S1007, a similar ciphertext generation unit 5051 performs homomorphic subtraction, and generates two pieces of ciphertexts E(PK, 1-0)=E(PK, 1) and E(PK, 1-1)=E(PK, 0) from E(PK, 1). That is, {c0, c1}={E(PK, 1), E(PK, 0)} is generated.

In S1008, a plaintext randomization unit 5052 generates random numbers r0 and r1 not being 0, performs homomorphic addition, and calculates {C0, C1} as in the following formula 3 and formula 4.

$$C0=E(PK, R0)=r0*c0=E(PK, 1) \diamond \ldots \diamond E(PK, 1)=E(PK, r0) \quad \text{Formula 3}$$

$$C1=E(PK, R1)=r1*c1=E(PK, 0) \diamond \ldots \diamond E(PK, 0)=E(PK, 0) \quad \text{Formula 4}$$

In S1009, a ciphertext disruption unit 50531 determines a replacement π randomly. It is here assumed that π is selected such that π(0)=1 and π(1)=0. In this regard, the order of {C0, C1}={E(PK, r0), E(PK, 0)} is replaced with {Cπ(0), Cπ(1)}={C1, C0}={E(PK, 0), E(PK, r0)}.

In S1010, a result transmission unit 5053 transmits {E(PK, 0), E(PK, r0)}.

In S1011, the reception unit 401 receives {E(PK, 0), E(PK, r0)}.

In S1012, the decryption unit 406 decrypts E(PK, 0) and E(PK, r0) with the private key SK and obtains 0 and the random number r0 as plaintexts.

In S1013, since 0 appears by decryption, the output unit 407 outputs search result information 4071 to represent the fact that the similarity degree between a plaintext (0, 0, 1) of storage encryption data and the search data (0, 0, 0), i.e., the squared Euclidean distance is not more than the threshold value θ, i.e., not more than 1.

When the order replacement is not performed by the ciphertext disruption unit 50531 in S1009, it is always known to the data searcher that the zeroth ciphertext is a value obtained by subtracting 0 from the encryption similarity, the first ciphertext is a value obtained by subtracting 1 from the encryption similarity, . . . , the θth ciphertext is a value obtained by subtracting θ from the encryption similarity. Thus, when 0 appears in the j-th number by decryption, it is simply known to the data searcher that the similarity degree is j. Thus, by performing order replacement by the ciphertext disruption unit 50531 in S1009, it is possible to convert into information to represent only whether the similarity degree between the storage data and the search data is not more than the threshold value or not.

*Explanation of Effects According to Present Embodiment*

As described above, in addition to obtaining the similar effect as in the first embodiment, by the secret search system 100 according to the present embodiment, it is only known to the data searcher from the search result whether or not the similarity degree between the storage data and the search data is not more than the threshold value or not; hence, the security is further improved.

Third Embodiment

In the present embodiment, parts different from those in the first and second embodiments will be mainly discussed.

In the present embodiment, a secret search method to attain a similar purpose as in the second embodiment, the secret search method being different from that in the second embodiment, will be described.

In the present embodiment, it is described a method to improve security of the secret search system similarly as in the second embodiment by using the replacement function π{0, 1, . . . , θ}→{0, 1, . . . , θ} similarly as in the second embodiment.

The secret search system of the present embodiment is mostly the same as in the second embodiment, but only a part of search processing is different.

*Explanation of Configuration*

The configuration of the secret search system 100 according to the present embodiment is similar to what is described in the second embodiment.

In the present embodiment, component parts having similar functions as the component parts described in the second embodiment are denoted by the same signs, and the explanation is omitted.

A ciphertext disruption unit 50531 according to the present embodiment disrupts an assembly of random ciphertexts 50520 by replacing component parts of one random ciphertext with component parts of the other random ciphertext in two random ciphertexts in the assembly of the random ciphertexts 50520. The ciphertext disruption unit 50531 generates an assembly of the random ciphertexts 50520 disrupted as a disruption random ciphertext 5002.

*Explanation of Operation*

Figure 13:
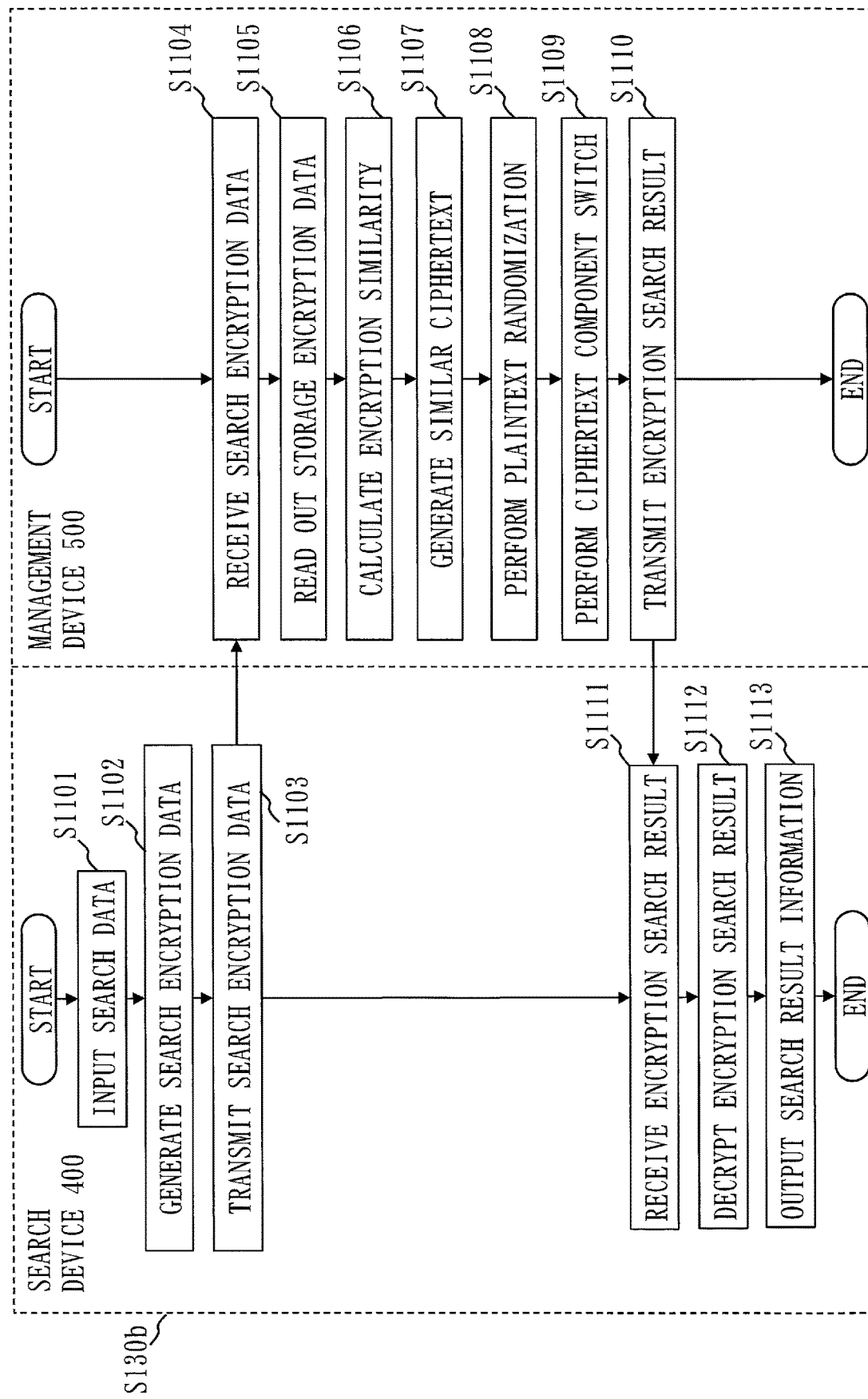
FIG. 13 is a flowchart illustrating search processing S130b of a secret search system 100 according to a third embodiment.

FIG. 13 is a flowchart illustrating search processing S130b of the secret search system 100 in the present embodiment.

S1101 through S1113 in FIG. 13 is processing performed by search devices 400 and a management device 500. S1101 through S1103 and S1111 through S1113 is processing performed by the search devices 400. S1104 through S1110 is processing performed by the management device 500.

Since S1101 through S1108 in the present search processing is processing similar to that in S1001 through S1008 in the second embodiment, the explanation is omitted.

<Processing of Management Device 500>

In S1109, the ciphertext disruption unit 50531 randomly replaces components at the same positions in a plaintext (Ri1, Ri2, . . . , Rin) of a certain random ciphertext Ci=E(PK, Ri1, Ri2, . . . , Rin) and a plaintext (Rj1, Rj2, Rjn) of a certain random ciphertext Cj=E(PK, Rj1, Rj2, . . . , Rjn) for an assembly of random ciphertexts {C0, C1, . . . , Cθ} generated in S1108. By repeating such replacement, the ciphertext disruption unit 50531 generates an assembly of disruption random ciphertexts (RC1, RC2, RCn).

Specifically, the ciphertext disruption unit 50531 replaces only R1 in Ci with Rj1 in Cj, and generates new ciphertexts RCi=E(PK, Rj1, Ri2, . . . , Rin) and RCj=E(PK, Rj1, Rj2, . . . , Rjn). By repeating such processing, the ciphertext disruption unit 50531 generates the disruption random ciphertexts {RC1, RC2, RCn}.

In S1110, a transmission unit 50532 transmits the assembly of disruption random ciphertexts {RC1, RC2, . . . , RCn} generated in S1109 as an encryption search result 5001 to the search devices 400.

<Processing of Search Devices 400>

In S1111, a reception unit 401 receives the encryption search result {RC1, RC2, . . . , RCn} transmitted in S1110.

In S1112, a decryption unit 406 decrypts the encryption search result {RC1, RC2, . . . , RCn} received in S1011 with a private key SK stored in a key storage unit 402, and obtains a search result 4061.

In S1113, an output unit 407 outputs search result information 4071 based on the search result 4061 obtained in S1112.

By S1113, the search processing S130b of the secret search system 100 ends.

<Explanation of Specific Example 40 of Search Processing>

Based on the homomorphic encryption of the specific example 1 as described above, a specific example 40 of the search processing S130b in the present embodiment will be discussed. In this regard, explanation is made supposing that storage data is (0, 1, 2), search data is (0, 0, 0), and θ=2. The squared Euclidean distance between the storage data (0, 1, 2) and the search data (0, 0, 0) is 10. Meanwhile, if binary number representation is adopted as 3=10, the Hamming distance between the storage data (0, 1, 2) and the search data (0, 0, 0) is 2. In this regard, it is assumed that S1=10 and S2=2. In the present embodiment, it is desired to convey to a data searcher that as the similarity degree between the storage data and the search data, the squared Euclidean distance is larger than 2, and the Hamming distance is not more than 2.

In S1106, an encryption similarity calculation unit 504 calculates an encryption similarity E(PK, S1, S2)=(E(PK, 10), E(PK, 2)).

In S1107, a similar ciphertext generation unit 5051 performs homomorphic subtraction, and generates E(PK, 10, 2)=(E(PK, 10), E(PK, 2)), E(PK, 9, 1)=(E(PK, 9), E(PK, 1)), E(PK, 8, 0)=(E(PK, 8), E(PK, 0)) from E(PK, S1, S2)=(E(PK, 10)), E(PK, 2)). That is, {c0, c1, c2}={E(PK, 10, 2), E(PK, 9, 1), E(PK, 8, 0)} is generated.

In S1108, a plaintext randomization unit 5052 generates a random number not being 0, performs homomorphic addition and calculates {C0, C1, C2} as follows.

$$C0 = E(PK, R0, R1)$$

$$C1 = E(PK, R2, R3)$$

$$C2 = E(PK, R4, 0)$$

In this regard, R0, R1, R2, R3 and R4 are random numbers.

In S1109, it is assumed that the ciphertext disruption unit 50531 selects $\pi1(1)=2$, $\pi1(2)=1$, $\pi1(3)=3$, and $\pi2(1)=3$, $\pi2(2)=2$, $\pi2(3)=2$, as $\pi1$ to replace the first components randomly, and as $\pi2$ to replace the second components randomly. In this regard, {RC0, RC1, RC2} ={E(PK, R2, 0), E(PK, R0, R1), E(PK, R4, R3)} is obtained. Since this replacement of components between ciphertexts can be performed only by simply replacing ciphertexts, the replacement can be easily performed.

In S1110, a result transmission unit 5053 transmits {E(PK, R2, 0), E(PK, R0, R1) and E(PK, R4, R3)}.

In S1111, the reception unit 401 receives {E(PK, R2, 0), E(PK, R0, R1) and E(PK, R4, R3)}.

In S1112, the decryption unit 406 decrypts E(PK, R2, 0), E(PK, R0, R1) and E(PK, R4, R3) with the private key SK. The decryption unit 406 obtains R2, R0, R4 as plaintext related to S1, and obtains 0, R1, R3 as plaintext related to S2.

In S1113, since 0 does not appear as the plaintext related to S1, the output unit 407 outputs search result information 407 to represent that a similarity degree related to the squared Euclidean distance between the storage data and the search data is larger than a threshold value, i.e., larger than 2. Further, since 0 appears as the plaintext related to S2, the output unit 407 outputs search result information 4071 to represent that a similarity degree related to the Hamming distance between the storage data and the search data is not more than the threshold value, i.e., not more than 2.

\*\*\*Explanation of Effects According to Present Embodiment\*\*\*

As described above, by the secret search system 100 according to the present embodiment, since it is only known to a data searcher, from a search result, whether or not a similarity degree between storage data and search data is not more than a threshold value, in addition to obtaining the similar effect as in the first embodiment, the security is further improved.

Further, in the present embodiment, it is possible to obtain the similar effect as in the second embodiment by using the disruption method different from that in the second embodiment.

Fourth Embodiment

In the present embodiment, parts different from those in the first through third embodiments will be mainly described.

In the present embodiment, a secret search method to attain a similar purpose as the second and third embodiments, the secret search method using a method different from those in the second and third embodiments, will be described.

Further, the secret search system according to the present embodiment has an advantage of capability to minimize a size of an encryption search result over the first through third embodiments. Meanwhile, in the secret search system according to the present embodiment, it is necessary to use a homomorphic encryption wherein homomorphic multiplication can be performed θ+1 times.

The secret search system of the present embodiment is mostly the same as that in the third embodiment, but only a part of search processing is different.

\*\*\*Explanation of Configuration\*\*\*

The configuration of the secret search system 100 according to the present embodiment is similar to that described in the second embodiment.

In the present embodiment, component parts having similar functions as the component parts described in the second embodiment are denoted by the same signs, and the explanation is omitted.

A ciphertext disruption unit 50531 disrupts an assembly of random ciphertexts 50520 by combining all random ciphertexts included in the assembly of random ciphertexts 50520 by homomorphic multiplication. The ciphertext disruption unit 50531 generates one combination ciphertext combining the assembly of the random ciphertexts 50520 as a disruption random ciphertext 5002.

*Explanation of Operation*

Figure 14:
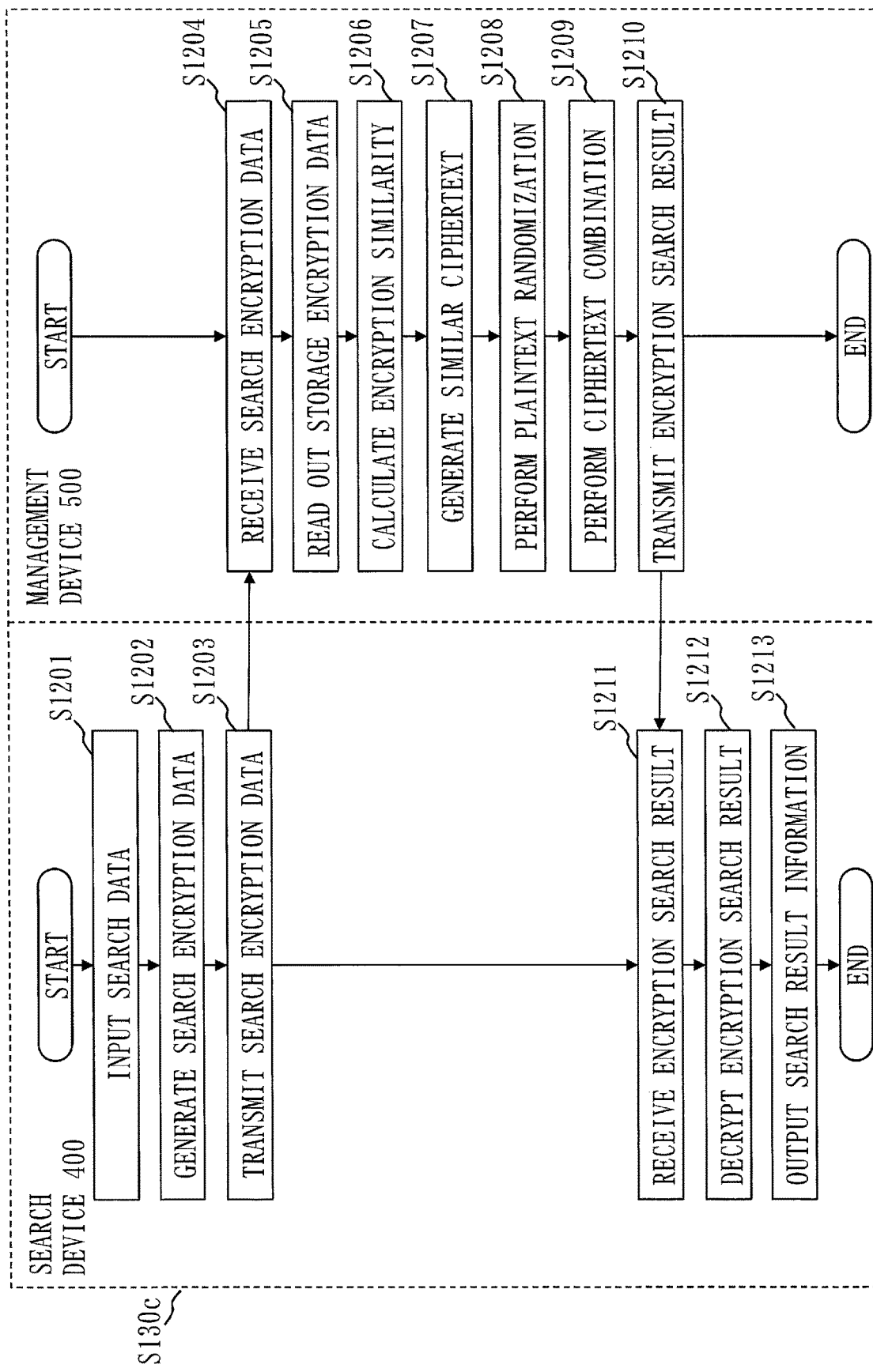
FIG. 14 is a flowchart illustrating search processing S130c of a secret search system 100 according to a fourth embodiment.

FIG. 14 is a flowchart illustrating search processing S130c of the secret search system 100 in the present embodiment.

S1201 through S1213 in FIG. 14 is processing performed by search devices 400 and a management device 500. S1201 through S1203 and S1211 through S1213 is processing performed by the search devices 400. S1204 through S1210 is processing performed by the management device 500.

Since S1201 through S1208 in the search processing A130c of the present embodiment is processing similar to S1101 through S1108 in the third embodiment, the explanation is omitted.

In S1209, the ciphertext disruption unit 50531 calculates a combination ciphertext $CC=C0 \diamond C1 \diamond \ldots \diamond C\theta = E(PK, Z1, Z2, \ldots, Zn)$ for the assembly of the random ciphertexts $\{C0, C1, \ldots, C\theta\}$ generated in S1208 with a public key PK stored in a key storage unit 502. In this regard, it is assumed that $Ci=E(PK, Ri1, Ri2, \ldots, Rin)$ (i is an integer number that satisfies $0 \le i \le \theta$), and $Zj=R0j*R1j \ldots *R\theta j$ (i is an integer number that satisfies $0 \le i \le 0$).

Note that if (i, j) that satisfies $Rij=0$ exists, $Zj=R0j*R1j* \ldots *R\theta j=0$ is obtained.

In S1210, a result transmission unit 5053 transmits the combination ciphertext CC generated in S1209 as an encryption search result 5001 to the search devices 400.

In S1211, a reception unit 401 receives the encryption search result CC transmitted in S1210.

In S1212, a decryption unit 406 decrypts the encryption search result CC received in S1211 with a private key SK stored in a key storage unit 402, and obtains a search result $Z1, Z2, \ldots, Zn$.

In S1213, an output unit 407 outputs the search result obtained in S1212.

Now, based on the homomorphic encryption wherein homomorphic multiplication can be performed $\theta+1$ times, an example of the search processing S130c according to the present embodiment will be described. In this regard, explanation is made assuming that storage data is (0, 1, 2), search data is (0, 0, 0) and $\theta=2$. In this regard, the squared Euclidean distance between the storage data (0, 1, 2) and the search data (0, 0, 0) is 10. Meanwhile, if binary number representation is adopted as 3=10, the Hamming distance between the storage data (0, 1, 2) and the search data (0, 0, 0) is 2. In this regard, it is assumed that S1=10 and S2=2. In the present embodiment, it is desired to convey to a data searcher that as a similarity degree between the storage data and the search data, the squared Euclidean distance is larger than 2, and the Hamming distance is not more than 2.

In S1206, an encryption similarity calculation unit 504 calculates an encryption similarity $E(PK, S1, S2)=(E(PK, 10), E(PK, 2))$.

In S1207, a similar ciphertext generation unit 5051 performs homomorphic subtraction, and generates $E(PK, 10, 2)=(E(PK, 10), E(PK, 2)), (E(PK, 9, 1)=(E(PK, 9), E(PK, 1)), E(PK, 8, 0)=(E(PK, 8), E(PK, 0))$ from $E(PK, S1, S2)=(E(PK, 10), E(PK, 2))$, to obtain $\{c0, c1, c2\}=\{E(PK, 10, 2), E(PK, 9, 1), E(PK, 8, 0)\}$.

IN S1208, a plaintext randomization unit 5052 generates a random number not being 0, performs homomorphic addition, and calculates $\{C0, C1, C2\}$ as follows.

$C0=E(PK,R0,R1)$ $C1=E(PK,R2,R3)$ $C2=E(PK,R4,0)$

In this regard, R0, R1, R2, R3 and R4 are random numbers.

In S1209, the ciphertext disruption unit 50531 performs homomorphic multiplication, and calculates the combination ciphertext $CC=E(PK, R0*R2*R4, R1*R3*0)=E(PK, R, 0)$. In this regard, it is assumed $R=R0*R2*R4$.

In S1210, the transmission unit 50532 transmits $CC=E(PK, R, 0)$.

In S1211, the reception unit 401 receives $E(PK, R, 0)$.

In S1212, the decryption unit 406 decrypts $E(PK, R, 0)$ with the private key SK, and obtains R as plaintext related to S1, and obtains 0 as plaintext related to S2.

In S1213, since the random number R appears as the plaintext related to S1, the output unit 407 outputs search result information 4071 to represent that a similarity degree related to the squared Euclidean distance between the storage data and the search data is larger than a threshold value, i.e., larger than 2. Further, since 0 appears as the plaintext related to S2, the output unit 407 outputs search result information 4071 to represent that a similarity degree related to the Hamming distance between the storage data and the search data is not more than the threshold value, i.e., not more than 2.

*Explanation of Effect According to Present Embodiment*

As described above, by the secret search system 100 according to the present embodiment, it is possible to minimize a size of an encryption search result in comparison with the first through third embodiments by using a disturbance method such as to combine ciphertexts by using homomorphic operation, in addition to obtaining effects similar to those in the second and third embodiments.

*Explanation of Hardware Configuration Example*

Finally, one example of a hardware configuration of each device of the key generation device 200, the registration devices 300, the search devices 400 and the management devices 500 and 500a will be described.

Each device of the key generation device 200, the registration devices 300, the search devices 400, and the management devices 500 and 500a is a computer.

Each device of the key generation device 200, the registration devices 300, the search devices 400, and the management devices 500 and 500a is equipped with hardware components such as a processor 901, an auxiliary storage device 902, a memory 903, a communication device 904, an input interface 905 and a display interface 906.

The processor 901 is connected to the other hardware components via a signal line 910 to control the other hardware components.

The input interface 905 is connected to an input device 907.

The display interface 906 is connected to a display 908.

The processor 901 is an integrated circuit (IC) that performs processing.

The processor 901 is, as a specific example, a central processing unit (CPU), a digital signal processor (DSP), or a graphics processing unit (GPU).

The auxiliary storage device 902 is, as a specific example, a read only memory (ROM), a flash memory, or a hard disk drive (HDD).

The memory 903 is, as a specific example, a random access memory (RAM).

The communication device 904 includes a receiver 9041 to receive data and a transmitter 9042 to transmit data.

The communication device 904 is, as a specific example, a communication chip or a network interface card (NIC).

The input interface 905 is a port whereto a cable 911 of the input device 907 is connected.

The input interface 905 is, as a specific example, a universal serial bus (USB) terminal.

The display interface 906 is a port whereto a cable 912 of the display 908 is connected.

The display interface 906 is, as a specific example, a USB terminal or a high definition multimedia interface (HDMI (registered trademark)) terminal.

The input device 907 is, as a specific example, a mouse, a keyboard, or a touch panel.

The display 908 is, as a specific example, a liquid crystal display (LCD).

When a computer is the key generation device 200, in the auxiliary storage device 902, a program to realize the functions of the key generation unit and the key transmission unit as illustrated in FIG. 2 is stored.

Further, when computers are the registration devices 300, in the auxiliary storage device 902, a program to realize the functions of the input unit, the encryption unit, the data transmission unit, the key reception unit and the key storage unit as illustrated in FIG. 3 is stored.

Furthermore, when computers are the search devices 400, in the auxiliary storage device 902, a program to realize the functions of the input unit, the encryption unit, the key storage unit, the search data transmission unit, the decryption unit and the output unit as illustrated in FIG. 4 is stored.

Further, when a computer is the management device 500, in the auxiliary storage device 902, a program to realize the functions of the data reception unit, the data storage unit, the threshold value storage unit, the key storage unit, the encryption similarity calculation unit, the similar ciphertext generation unit, the plaintext randomization unit and the result transmission unit as illustrated in FIG. 5 is stored.

Furthermore, when a computer is the management device 500a, in the auxiliary storage device 902, a program to realize the functions of the data reception unit, the data storage unit, the threshold value storage unit, the key storage unit, the encryption similarity calculation unit, the similar ciphertext generation unit, the plaintext randomization unit, the ciphertext disruption unit and the transmission unit as illustrated in FIG. 11 is stored.

In the following, the component parts enumerated in each device of the key generation device 200, the registration devices 300, the search devices 400 and the management devices 500 and 500a are indicated collectively as "units" for each device.

The input unit 303 in the registration devices 300 and the input unit 403 in the search devices 400 may be realized by the input interface 905 and the input device 907.

Furthermore, the output unit 407 in the search devices 400 may be realized by the display interface 906 and the display 908.

Further, the key transmission unit 202 in the key generation device 200, the search data transmission unit 405 in the search devices 400, the result transmission unit 5053 in the management device 500, and the transmission unit 50532 in the management device 500a may also be realized by the communication device 904.

Furthermore, the reception unit 401 in the search devices 400, and the data reception unit 501 in the management devices 500 and 500a may be realized by the communication device 904.

Further, the key storage unit 302 in the registration devices 300 and the key storage unit 402 in the search devices 400 may be realized by the auxiliary storage device 902. In addition, the data storage unit 503 of the management device 500, the key storage unit 502 and the threshold value storage unit 506 may be realized by the auxiliary storage device 902.

The program to realize the functions of the "units" may be configured by one program, or may be configured by a plurality of programs.

The program is loaded into the memory 903, read into the processor 901, and executed by the processor 901.

Further, the auxiliary storage device 902 also stores an operating system (OS).

Then, at least a part of the OS is loaded into the memory 903, and the processor 901 executes the program to realize the functions of the "units" while executing the OS.

Figure 15:
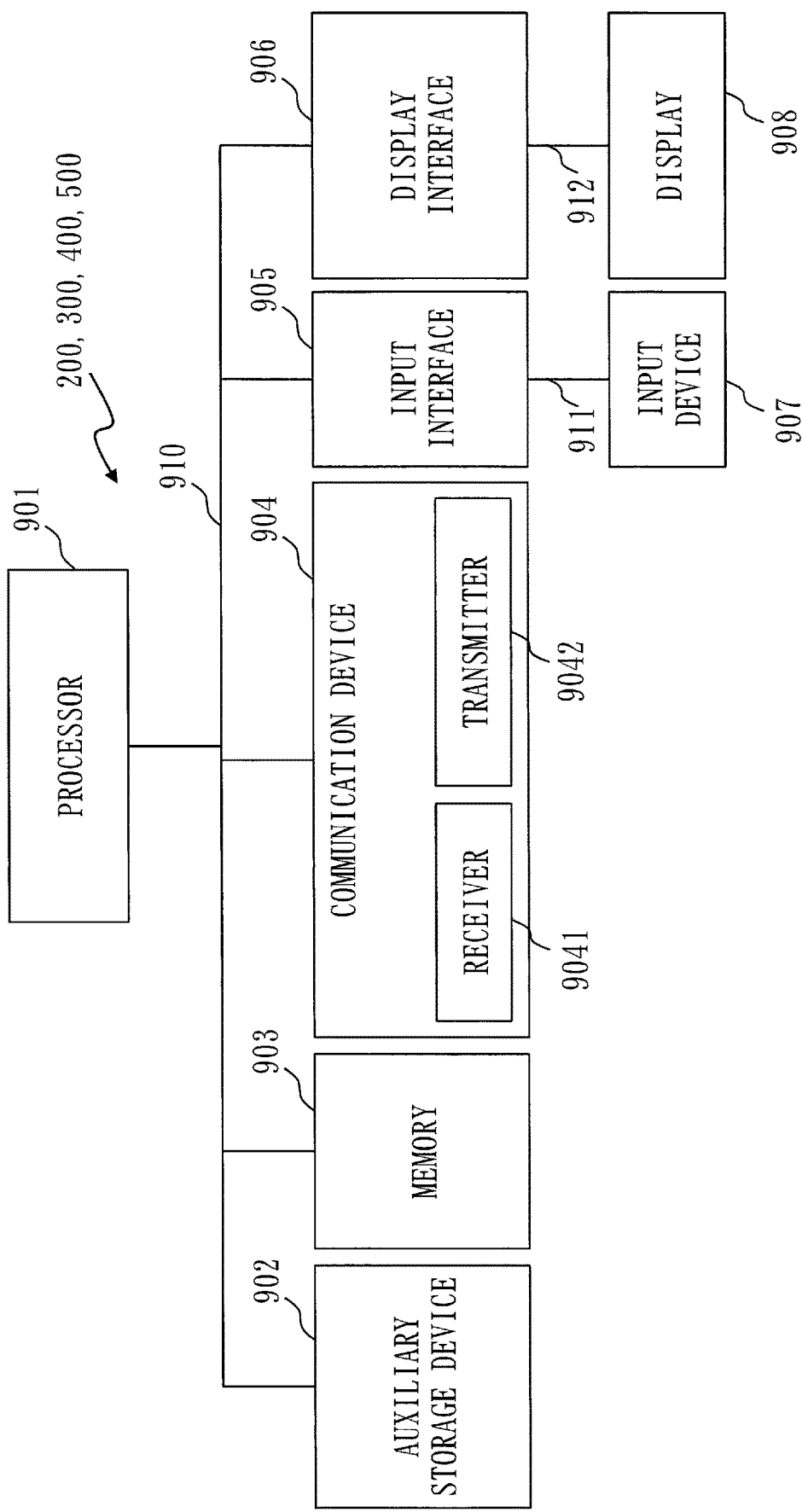

In FIG. 15, one processor 901 is illustrated; however, each of the key generation device 200, the registration devices 300, the search devices 400 and the management devices 500 and 500a may be equipped with a plurality of processors 901.

Then, the plurality of processors 901 may cooperatively execute the program to realize the functions of the "units."

Further, the information, data, signal values and variable values indicating the results of the processing by the "units" are stored in the memory, the auxiliary storage device 902, or a register or a cache memory in the processor 901.

The program to realize the functions of the "units" may be stored in a storage medium such as a magnetic disk, a flexible disk, an optical disc, a compact disk, a blue-ray (registered trademark) disc, a digital versatile disc (DVD), etc.

The "units" may be provided by "processing circuitry."

Alternatively, the "units" may be replaced with "circuits", "steps", "procedures" or "processes."

The "circuits" and "processing circuitry" are concepts that include not only the processor 901 but also processing circuits of other types, such as a logic IC, a gate array (GA), an application specific integrated circuit (ASIC), or a field-programmable gate array (FPGA).

What is referred to as a program product is a storage medium or a storage device recording the program to realize the functions described as the "units," into which a computer-readable program is loaded, irrespective of the form as it appears.

In the above embodiment, in each device of the key generation device 200, the registration devices 300, the search devices 400 and the management devices 500 and 500a, each of the "units" configures each device as an independent functional block. However, the configuration of each device may be different from the configuration as mentioned above, and the configuration of each device is arbitrary. These functional blocks of each device are arbitrary as long as the functional blocks can realize the functions as described in the above embodiments. Each device of the key generation device 200, the registration devices 300, the search devices 400 and the management devices 500 and 500a may be configured by any other combination of or an arbitrary block configuration of these functional blocks.

Further, each device of the key generation device 200, the registration devices 300, the search devices 400 and the management devices 500 and 500a may not be one device, but may be a system configured by a plurality of devices.

Furthermore, the above describes the first though fourth embodiments; meanwhile, more than one of those four embodiments may be partially combined and implemented. Otherwise, one embodiment out of those four embodiments may be partially implemented. Additionally, those four embodiments may be implemented partially or as a whole, in any combined manner.

Note that the embodiments as mentioned above are essentially preferable examples, not aiming at limiting the range of the present invention, application and use thereof, and various alterations can be made as needed.

REFERENCE SIGNS LIST

100: secret search system; 101: network; 200: key generation device; 201: key generation unit; 202: key transmission unit; 300: registration device; 301: key reception unit; 302: key storage unit; 303: input unit; 304: encryption unit; 305: data transmission unit; 400: search device; 401: reception unit; 402: key storage unit; 403: input unit; 404: encryption unit; 405: search data transmission unit; 406: decryption unit; 4061: search result; 407: output unit; 4071: search result information; 500, 500a: management device; 5001: encryption search result; 5002: disruption random ciphertext; 501: data reception unit; 502: key storage unit; 503: data storage unit; 504: encryption similarity calculation unit; 5041: encryption similarity; 505: encryption result transmission unit; 5051: similar ciphertext generation unit; 50510: similar ciphertext; 5052: plaintext randomization unit; 50520: random ciphertext; 5053: result transmission unit; 50531: ciphertext disruption unit; 50532: transmission unit; 506: threshold value storage unit; θ: threshold value; 610: storage data; 620: storage encryption data; 710: search data; 720: search encryption data; 901: processor; 902: auxiliary storage device; 903: memory; 904: communication device; 905: input interface; 906: display interface; 907: input device; 908: display; 910: signal line; 911, 912: cable; 9041: receiver; 9042: transmitter; 9100: secret search method; 9200: secret search program; S100: secret search processing; S110: key generation processing; S120: registration processing; S130, S130a, S130b, S130c: search processing; S806: encryption similarity calculation processing; S807: similar ciphertext generation processing; S808: plaintext randomization processing; S809: result transmission processing; PK: public key; SK: private key

The invention claimed is:

1. A secret search system comprising:
a management device including
processing circuitry to:
calculate, by performing a homomorphic operation on storage encryption data being storage data encrypted using a homomorphic encryption, and search encryption data being search data encrypted using the homomorphic encryption, the search data being used in search of the storage data, an encryption similarity which is a similarity degree between the storage data and the search data being encrypted using the homomorphic encryption, and
generate a plurality of similar ciphertexts which are a plurality of plaintexts similar to the similarity degree being respectively encrypted using the homomorphic encryption by using the encryption similarity and a threshold value of the similarity degree, generate an encryption search result to represent whether or not the similarity degree is not more than the threshold value by using the plurality of similar ciphertexts generated, and transmit the encryption search result generated, and
a search device including
processing circuitry to:
decrypt the encryption search result transmitted from the management device, and output the encryption search result decrypted as a search result, and
output search result information to represent whether the similarity degree is not more than the threshold value or not, based on the search result.

2. The secret search system as defined in claim 1,
wherein the processing circuitry of the management device
generates the plurality of similar ciphertexts, the similar ciphertext generating the plurality of similar ciphertexts, which are a plurality of plaintexts being respectively encrypted using the homomorphic encryption, wherein at least one of the plurality of plaintexts is 0 when the similarity degree is not more than the threshold value,
randomizes the plurality of plaintexts of the plurality of similar ciphertexts, and generates an assembly of random ciphertexts wherein the plurality of plaintexts randomized are respectively encrypted using the homomorphic encryption, and
generates the encryption search result, by using the assembly of the random ciphertexts generated, and transmits the encryption search result generated.

3. The secret search system as defined in claim 2,
wherein the processing circuitry of the management device randomizes a plaintext whose value is not 0 of the plurality of plaintexts while letting a plaintext whose value is 0 of the plurality of plaintexts be 0, and generates the assembly of the random ciphertexts wherein the plurality of plaintexts randomized are respectively encrypted using the homomorphic encryption, and
based on the search result, judges whether a plaintext whose value is 0 exists or not in the plurality of plaintexts, and when the plaintext whose value is 0 is judged to exist, outputs the search result information to represent that the similarity degree is not more than the threshold value, and when the plaintext whose value is 0 is judged not to exist in the plurality of plaintexts, outputs the search result information to represent that the similarity degree is larger than the threshold value.

4. The secret search system as defined in claim 3,
wherein the processing circuitry of the management device generates, when the similarity degree is not more than the threshold value, the plurality of similar ciphertexts which are the plurality of plaintexts, wherein a value-of-similarity-degree numbered plaintext from a top is 0, respectively encrypted using the homomorphic encryption,
and wherein the processing circuitry of the search device obtains, when the plaintext whose value is 0 is judged to exist in the plurality of plaintexts, an order of the plaintext whose value is 0 in the plurality of plaintexts, identifies the order as the similarity degree, and outputs the similarity degree identified.

5. The secret search system as defined in claim 2,
wherein the processing circuitry of the management device
disrupts the assembly of the random ciphertexts generated, and generates the assembly of the random ciphertexts disrupted as a disruption random ciphertext, and
transmits the assembly of the disruption random ciphertext generated, as the encryption search result,
and wherein the processing circuitry of the search device judges whether a plaintext whose value is 0 exists in the plurality of the plaintexts, and when the plaintext whose value of 0 is judged to exist, outputs the search result information to represent that the similarity degree is not more than the threshold value, and when the plaintext whose value is 0 is judged not to exist, outputs the search result information to represent that the similarity degree is larger than the threshold value.

6. The secret search system as defined in claim 5, wherein the processing circuitry of the management device disrupts, in the assembly of the random ciphertexts, the assembly of the random ciphertexts by changing an order of the random ciphertexts in the assembly of the random ciphertexts, and generates the assembly of the random ciphertexts whose order is changed as a disruption random ciphertext.

7. The secret search system as defined in claim 5, wherein the processing circuitry of the management device disrupts the assembly of the random ciphertexts by replacing, in two random ciphertexts in the assembly of the random ciphertexts, a component of one random ciphertext with a component of the other random ciphertext, and generates the assembly of the random ciphertexts disrupted as the disruption random ciphertext.

8. The secret search system as defined in claim 5, wherein the processing circuitry of the management device disrupts the assembly of the random ciphertexts by combining all random ciphertexts included in the assembly of the random ciphertexts using a homomorphic multiplication, and generates one combination ciphertext which is made by combining the assembly of the random ciphertexts as the disruption random ciphertext.

9. A management device comprising:
processing circuitry to:
calculate, by performing a homomorphic operation on storage encryption data being storage data encrypted using a homomorphic encryption, and search encryption data being search data encrypted using the homomorphic encryption, the search data being used in search of the storage data, an encryption similarity which is a similarity degree between the storage data and the search data being encrypted using the homomorphic encryption;
generate a plurality of similar ciphertexts, which are a plurality of plaintexts respectively being encrypted using the homomorphic encryption, the plurality of plaintexts being similar to the similarity degree, wherein at least one of the plurality of plaintexts is 0 when the similarity degree is not more than a threshold value;
randomize the plurality of plaintexts of the plurality of similar ciphertexts, and generate an assembly of random ciphertexts wherein the plurality of plaintexts randomized are respectively encrypted using the homomorphic encryption; and
generate, by using the assembly of the random ciphertexts generated, an encryption search result to represent whether or not the similarity degree is not more than the threshold value, and to transmit the encryption search result generated.

10. A secret search method of a secret search system including a management device to store storage data encrypted using a homomorphic encryption as storage encryption data, and a search device to search for the storage data by using search data, the secret search method comprising:
calculating, by performing a homomorphic operation on the storage encryption data, and search encryption data which is the search data being encrypted using the homomorphic encryption, an encryption similarity which is a similarity degree between the storage data and the search data being encrypted using the homomorphic encryption,
generating a plurality of similar ciphertexts which are a plurality of plaintexts similar to the similarity degree being respectively encrypted using the homomorphic encryption by using the encryption similarity and a threshold value of the similarity degree, and generating an encryption search result to represent whether or not the similarity degree is not more than the threshold value by using the plurality of similar ciphertexts generated;
decrypting the encryption search result generated, and outputting the encryption search result decrypted as a search result; and
outputting search result information to represent whether or not the similarity degree is not more than the threshold value, based on the search result.

11. A non-transitory computer readable medium storing a secret search program of a management device to store storage data encrypted using a homomorphic encryption as storage encryption data, to make a computer execute:
encryption similarity calculation processing to calculate, by performing a homomorphic operation on the storage encryption data, and search encryption data being search data encrypted using the homomorphic encryption, the search data being used in search of the storage data, an encryption similarity which is a similarity degree between the storage data and the search data being encrypted using the homomorphic encryption;
similar ciphertext generation processing to generate a plurality of similar ciphertexts, which are a plurality of plaintexts being respectively encrypted using the homomorphic encryption, the plurality of plaintexts being similar to the similarity degree, wherein at least one of the plurality of plaintexts is 0 when the similarity degree is not more than the threshold value;
plaintext randomization processing to randomize the plurality of plaintexts of the plurality of similar ciphertexts, and generate an assembly of random ciphertexts, wherein the plurality of plaintexts randomized are respectively encrypted using the homomorphic encryption; and
result transmission processing to generate, by using the assembly of the random ciphertexts generated by the plaintext randomization processing, an encryption search result to represent whether or not the similarity degree is not more than the threshold value, and to transmit the encryption search result generated.

* * * * *